United States Patent
Isobe

(10) Patent No.: US 11,325,311 B2
(45) Date of Patent: May 10, 2022

(54) INFORMATION PROCESSING APPARATUS, NON-TRANSITORY COMPUTER READABLE MEDIUM, AND THREE-DIMENSIONAL OBJECT FORMING SYSTEM

(71) Applicant: FUJIFILM Business Innovation Corp., Tokyo (JP)

(72) Inventor: Kimihiko Isobe, Yokohama (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/115,612

(22) Filed: Aug. 29, 2018

(65) Prior Publication Data
US 2019/0070783 A1 Mar. 7, 2019

(30) Foreign Application Priority Data

Sep. 5, 2017 (JP) .............................. JP2017-170578

(51) Int. Cl.
*B29C 64/386* (2017.01)
*B29C 64/147* (2017.01)
*G06T 15/08* (2011.01)
*B33Y 50/00* (2015.01)

(52) U.S. Cl.
CPC .......... *B29C 64/386* (2017.08); *B29C 64/147* (2017.08); *B33Y 50/00* (2014.12); *G06T 15/08* (2013.01)

(58) Field of Classification Search
None
See application file for complete search history.

(56) References Cited

U.S. PATENT DOCUMENTS

| 6,506,477 | B1* | 1/2003 | Ueda ...................... B41J 2/0057 428/195.1 |
| 9,073,259 | B2* | 7/2015 | Dufort .................. G03G 15/224 |
| 2002/0172409 | A1* | 11/2002 | Saito ....................... G06T 15/08 382/132 |
| 2004/0183796 | A1* | 9/2004 | Velde ..................... B29C 64/40 345/419 |
| 2008/0079717 | A1* | 4/2008 | Arita ....................... G06T 15/00 345/419 |
| 2013/0138234 | A1* | 5/2013 | Dufort .................... G06T 19/00 700/98 |

(Continued)

FOREIGN PATENT DOCUMENTS

| JP | 2000-177016 | 6/2000 |
| JP | 2013-114676 | 6/2013 |

OTHER PUBLICATIONS

Office Action dated Jun. 8, 2021 in corresponding Japanese application No. 2017-170578 and English Translation.

*Primary Examiner* — Jason Lin
(74) *Attorney, Agent, or Firm* — Fildes & Outland, P.C.

(57) ABSTRACT

There is provided an information processing apparatus. A receiving unit receives a data of printing. An output unit outputs image data of each of plural elements which are parts of recording media, if the receiving unit receives print data including height information of a three-dimensional object at positions of each pixel of image data on a two-dimensional image is generated such that the three-dimensional object is formed by stacking the plural elements, and the image data is generated from the height information of the three-dimensional object at the positions of the each pixel.

11 Claims, 27 Drawing Sheets

(56) References Cited

U.S. PATENT DOCUMENTS

| | | | |
|---|---|---|---|
| 2016/0009069 A1* | 1/2016 | Mou | B32B 37/02 |
| | | | 216/52 |
| 2016/0151981 A1* | 6/2016 | Nomura | G05B 19/4099 |
| | | | 700/98 |
| 2016/0263835 A1* | 9/2016 | Tanaka | H04N 1/00827 |
| 2017/0266883 A1* | 9/2017 | Yuji | B33Y 10/00 |
| 2017/0341304 A1* | 11/2017 | Miller | B33Y 50/02 |
| 2018/0162144 A1* | 6/2018 | Miller | A43B 3/0078 |

* cited by examiner

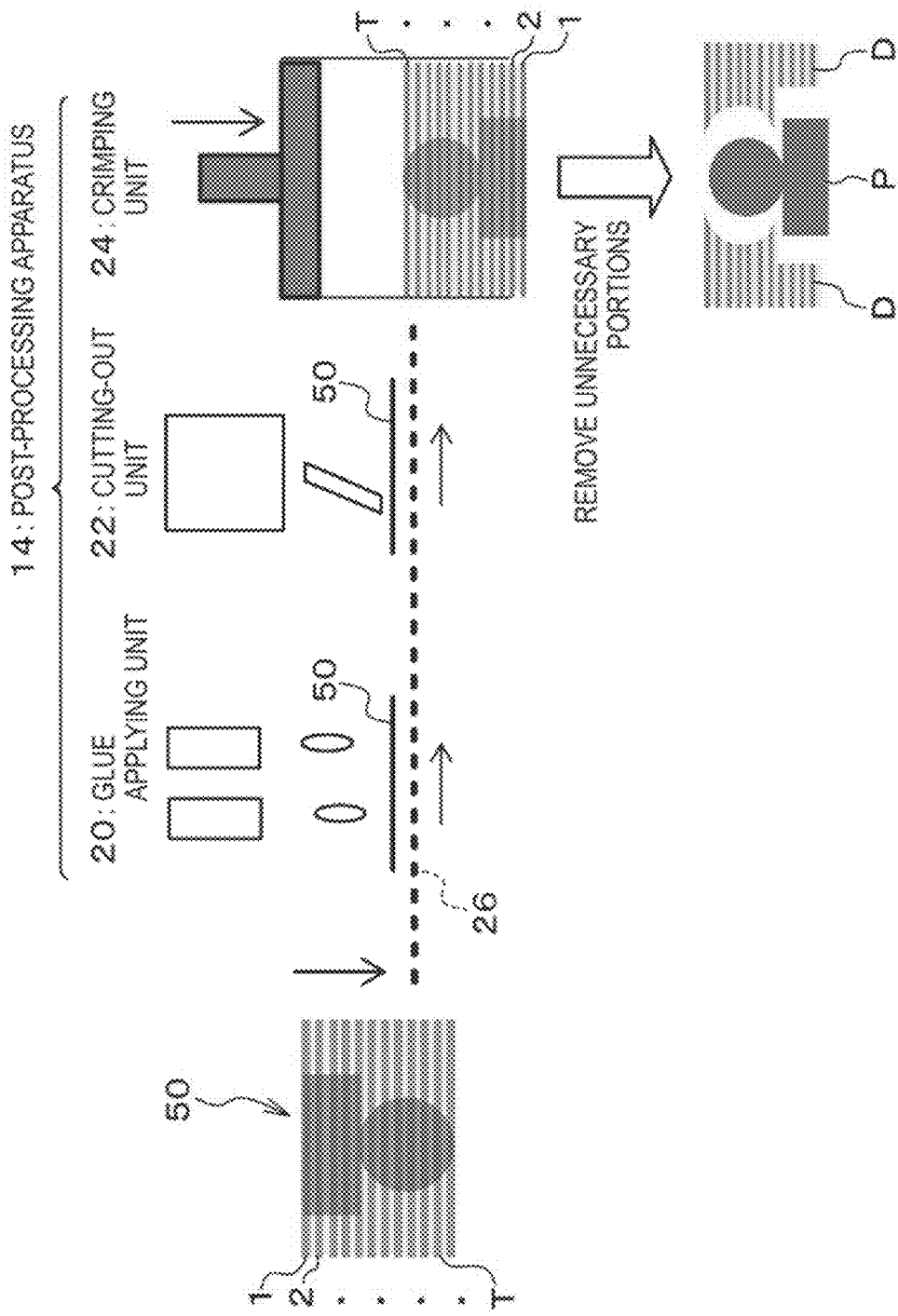

INFORMATION PROCESSING APPARATUS, NON-TRANSITORY COMPUTER READABLE MEDIUM, AND THREE-DIMENSIONAL OBJECT FORMING SYSTEM

CROSS-REFERENCE TO THE RELATED APPLICATIONS

This application is based on and claims priority under 35 USC 119 from Japanese Patent Application No. 2017-170578 filed on Sep. 5, 2017.

BACKGROUND

Technical Field

The present disclosure is related to information processing apparatus, non-transitory computer readable medium, and three dimensional object forming system.

SUMMARY

According to an aspect of the present invention, there is provided an information processing apparatus including: a receiving unit that receives a data of printing; and an output unit that outputs image data of each of plural elements which are parts of recording media, if the receiving unit receives print data including height information of a three-dimensional object at positions of each pixel of image data on a two-dimensional image is generated such that the three-dimensional object is formed by stacking the plural elements, and the image data is generated from the height information of the three-dimensional object at the positions of the each pixel.

BRIEF DESCRIPTION OF THE DRAWINGS

Exemplary embodiments of the present invention will be described in detail based on the following figures, wherein:

FIG. 5B is a schematic diagram illustrating a post-processing process of the sheet stacking type three-dimensional object formation;

FIGS. 29A, 298 and 29C are views illustrating examples of image data items for individual recording media, respectively;

DETAILED DESCRIPTION

Hereinafter, examples of exemplary embodiments of the present invention will be described with reference to the accompanying drawings.

First Exemplary Embodiment

<Three-Dimensional Object Forming System (Overall Configuration Thereof)>

First, a three-dimensional object forming system will be described.

A three-dimensional object forming system according to a first exemplary embodiment performs, for example, image formation using an electrophotographic system, on recording media, if receiving an image formation instruction. Also, the three-dimensional object forming system forms three-dimensional objects by a sheet stacking type three-dimensional object formation method of stacking recording media, if receiving a three-dimensional object formation instruction.

The sheet stacking type three-dimensional object formation method generates two or more slice data items by slicing three-dimensional data of a three-dimensional model with two or more planes, and forms a series of slice images on sheet-like recording media such as paper on the basis of the two or more slice data items. Thereafter, the above-mentioned method performs post-processing for three-dimensional object formation on the two or more recording media having the series of slice images thereon. For example, the above-mentioned method processes and stacks the two or more recording media. Here, a series of the slice images means that they correspond to two or more slice data items generated from three-dimensional data.

Figure 1:
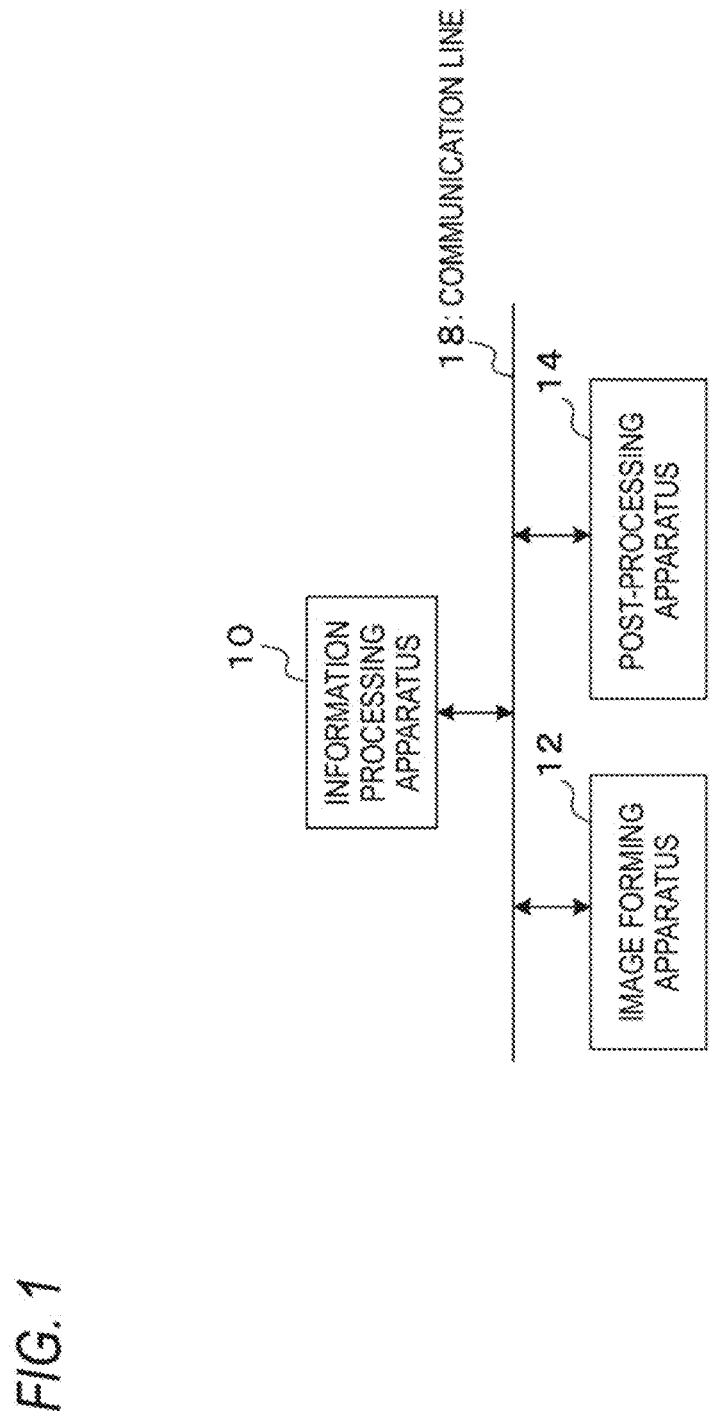
FIG. 1 is a block diagram illustrating an example of the configuration of a three-dimensional object forming system.
Figure 2:
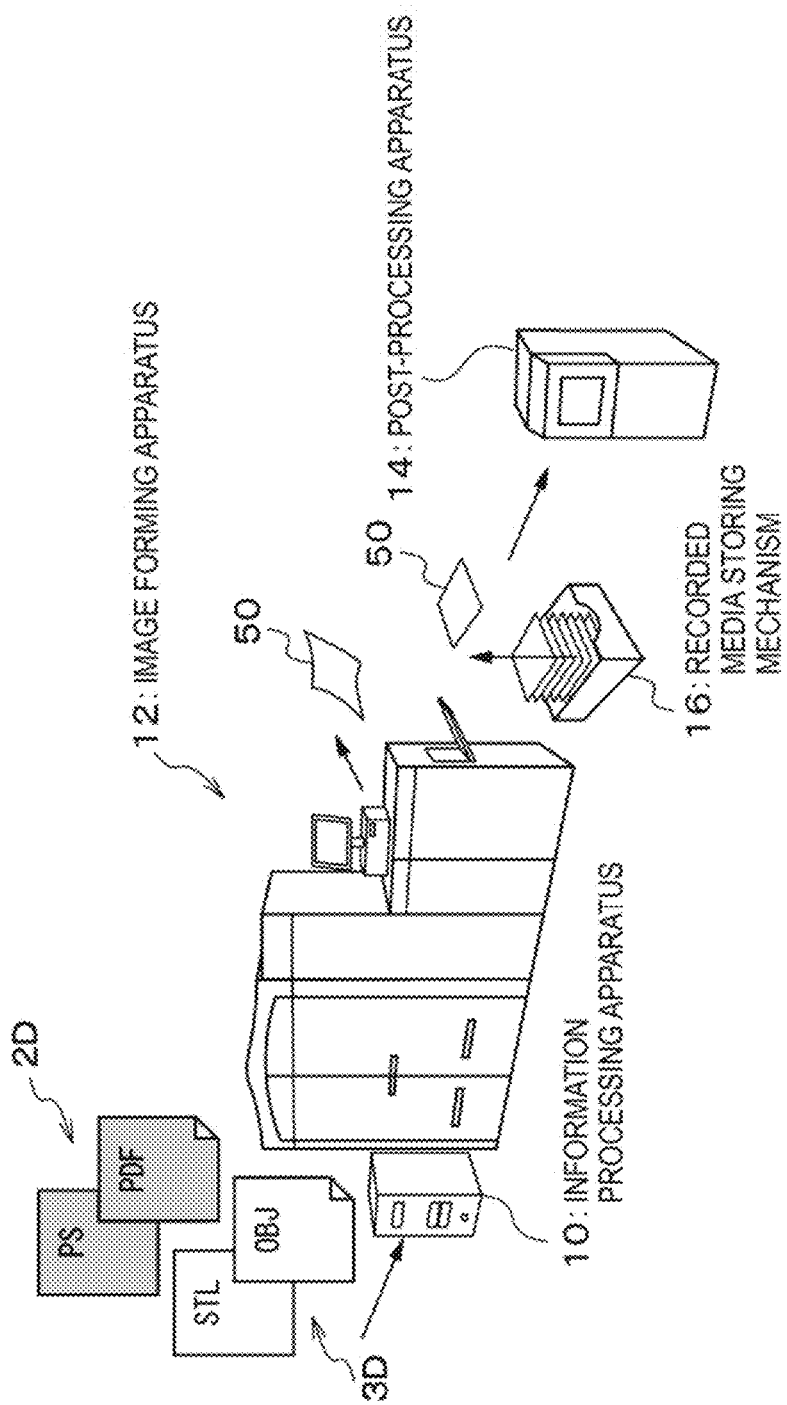
FIG. 2 is a schematic diagram illustrating the example of the configuration of the three-dimensional object forming system.

FIG. 1 is a block diagram illustrating an example of the configuration of the three-dimensional object forming system according to the first exemplary embodiment. FIG. 2 is a schematic diagram illustrating an example of the configuration of the three-dimensional object forming system. As shown in FIG. 1, the three-dimensional object forming system according to the first exemplary embodiment includes an information processing apparatus 10, an image forming apparatus 12, and a post-processing apparatus 14 for three-dimensional object formation. The information processing apparatus 10, the image forming apparatus 12, and the post-processing apparatus 14 for three-dimensional object formation are connected to one another via a communication line 18 such that communication is possible. Hereinafter, the post-processing apparatus 14 for three-dimensional object formation will be referred to simply as the post-processing apparatus 14.

(Information Processing Apparatus)

Figure 4:
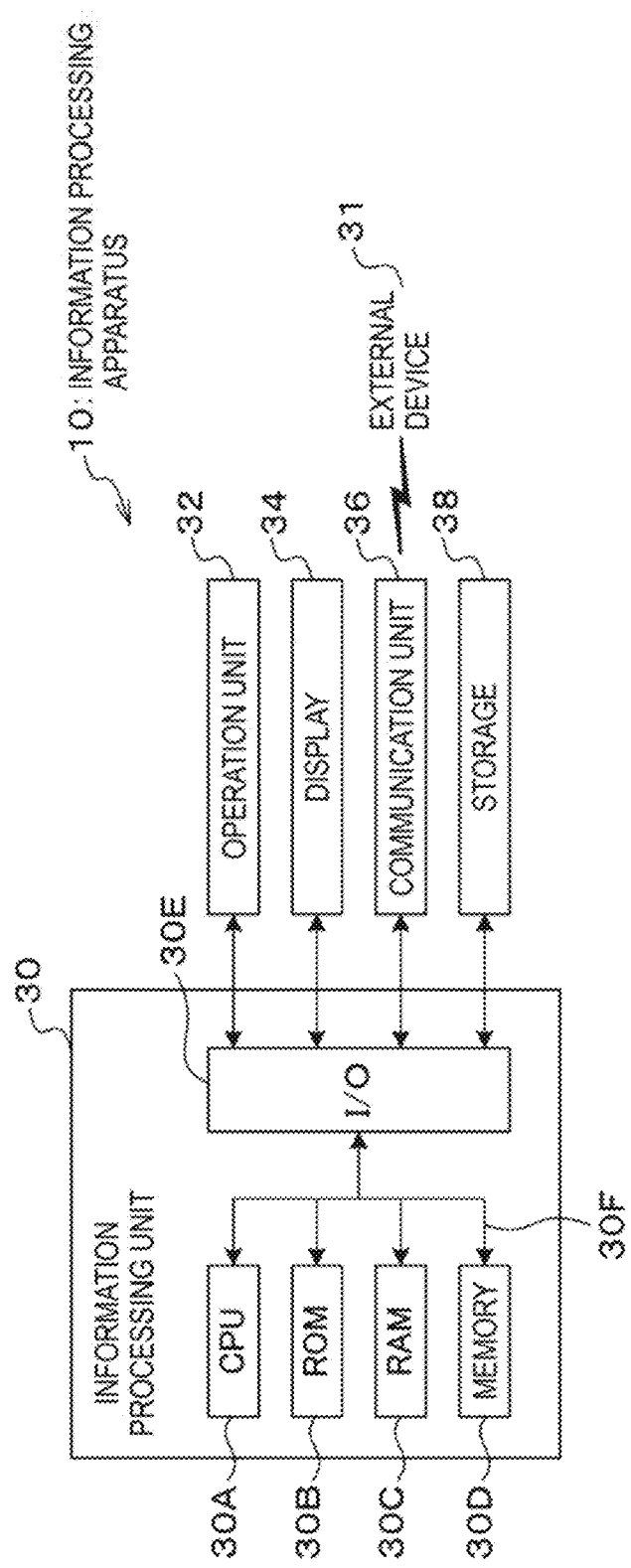
FIG. 4 is a block diagram illustrating an example of the electrical configuration of an information processing apparatus.

FIG. 4 is a block diagram illustrating an example of the electrical configuration of the information processing apparatus. As shown in FIG. 4, the information processing apparatus 10 includes an information processing unit 30, an operation unit 32 configured to receive user's operations, a display 34 configured to display information for users, a communication unit 36 configured to perform communication with an external device 31, and a storage 38 such as an external storage device. The operation unit 32, the display 34, the communication unit 36, and the storage 38 are connected to an input/output interface (I/O) 30E of the information processing unit 30.

The information processing unit 30 includes a central processing unit (CPU) 30A, a read only memory (ROM) 308, a random access memory (RAM) 30C, a non-volatile memory 30D, and the I/O 30E. Further, the CPU 30A, the ROM 30B, the RAM 30C, the non-volatile memory 30D, and the I/O 30E are connected to one another via a bus 30F. The CPU 30A reads out programs from the ROM 30B, and executes the programs, using the RAM 30C as a work area.

The operation unit 32 receives user's operations by a mouse, a keyboard, and the like. The display 34 displays various screens on a display or the like for users. The communication unit 36 performs communication with the external device 31 via a wired or wireless communication line. The communication unit 36 functions as an interface for performing communication with external devices such as a computer connected to the communication line such as a local area network (LAN), a dedicated line, or the Internet. The storage 38 includes a storage device such as a hard disk.

(Image Forming Apparatus)

The image forming apparatus 12 forms images on recording media 50 on the basis of image data. The image forming apparatus 12 is, for example, an apparatus for forming images on recording media by an electrophotographic system. The electrophotographic image forming apparatus 12 is configured to include photosensitive drums, charging units, exposing units, developing units, a transferring unit, a fixing unit, and so on. However, the image forming apparatus 12 may be configured as an inkjet recording apparatus. In this case, the image forming apparatus 12 is configured to include an inkjet recording head for ejecting ink drops onto recording media according to images.

(Post-Processing Apparatus)

Figure 3:
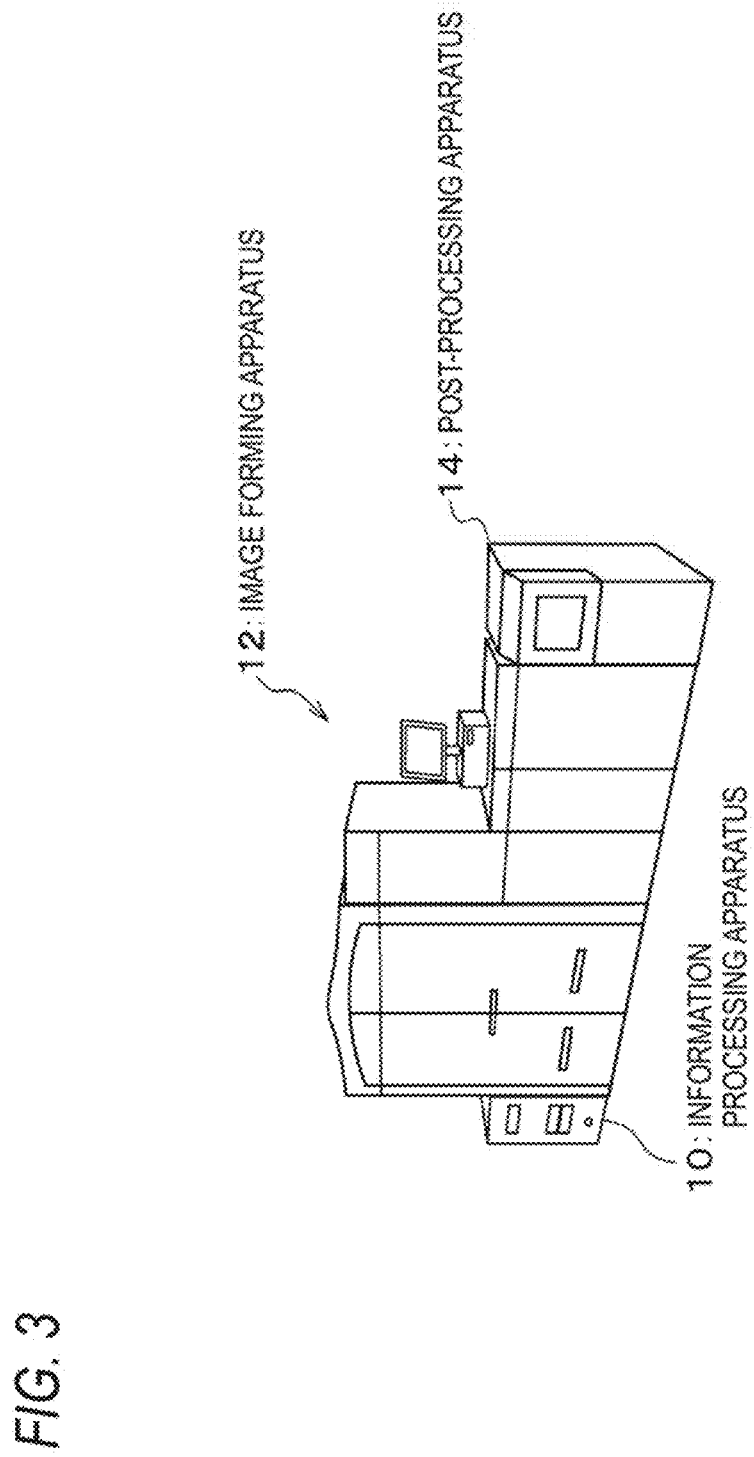
FIG. 3 is a schematic diagram illustrating another example of the configuration of the three-dimensional object forming system.

The post-processing apparatus 14 performs post-processing for three-dimensional object formation, on recording media 50 having a series of slice images formed by the image forming apparatus 12. The post-processing process for three-dimensional object formation will be described below. As shown in FIG. 2, the post-processing apparatus 14 may be arranged in a line different from a line including the image forming apparatus 12 and near the line including the image forming apparatus, such that they do not share a path for conveying recording media 50. However, as shown in FIG. 3, the post-processing apparatus 14 may be arranged in the line including the image forming apparatus 12 such that they share a path for conveying recording media 50.

In the case of the arrangement in which the post-processing apparatus and the image forming apparatus do not share a conveyance path, two or more recording media 50 having a series of slice images formed thereon are stacked in the order of formation of the slice images, and is stored in a recorded media storing mechanism 16 such as a stacker. Each stack of two or more recording media 50 is taken out from the recorded media storing mechanism 16, and is transferred into the post-processing apparatus 14 at once. Meanwhile, in the case of the arrangement in which the post-processing apparatus and the image forming apparatus share a conveyance path, recording media 50 having slice images formed thereon are transferred one by one into the post-processing apparatus 14.

(Information Processing According to Instruction)

In the above-described three-dimensional object forming system, the image forming apparatus 12 is not a dedicated apparatus for three-dimensional object formation. In the case where an image formation instruction has been received, the image forming apparatus 12 functions as a normal image forming apparatus. In other words, the information processing apparatus 10 basically performs different kinds of information processing according to whether a received instruction is an image formation instruction or a three-dimensional object formation instruction.

In the present exemplary embodiment, print data is used to issue an image formation instruction. Print data includes image data representing images and setting data representing print settings such as pages, the number of copies, and paper size. Also, in the present exemplary embodiment, print data is described in a page description language (PDL) for instructing the image forming apparatus 12 to form images. According to print data described in the page description language, raster image data items of individual pages are generated, and images of the individual pages are formed. Hereinafter, an image formation instruction will be referred to as print data.

If receiving the print data, the information processing apparatus 10 converts the image data into raster image data. Also, the information processing apparatus 10 generates command data to instruct each unit of the image forming apparatus to perform an image forming process, from the image data and the setting data. Thereafter, the information processing apparatus outputs the raster image data and the command data to the image forming apparatus 12.

In the present exemplary embodiment, three-dimensional data is used to issue a three-dimensional object formation instruction. Three-dimensional data is data including information necessary for three-dimensional object formation. In the present exemplary embodiment, three-dimensional data includes three-dimensional shape data representing a three-dimensional model to be an object of object formation, and setting data representing various settings such as slice intervals.

If the information processing apparatus 10 receives three-dimensional data, it generates two or more slice data items from three-dimensional shape data and setting data included in the three-dimensional data. Subsequently, the information processing apparatus generates a series of slice image data items and command data, from the two or more slice data items. Next, the information processing apparatus converts the series of slice image data items into a series of raster image data items. Then, the information processing apparatus outputs the series of raster image data items and the command data to the image forming apparatus 12.

Further, the information processing apparatus 10 generates a series of control data from the two or more slice data items. The series of control data is data for instructing the post-processing apparatus 14 to perform post-processing for three-dimensional object formation. As will be described below, the control data includes control data specifying cutting lines for cutting out stacking elements from recording media, and control data specifying paste application regions of the recording media to be coated with glue.

The information processing apparatus 10 according to the present exemplary embodiment receives instructions for three-dimensional object formation using print data, in addition to instructions for image formation using print data and instructions for three-dimensional object formation using three-dimensional data as described above. In three-dimensional object formation using print data, the information processing apparatus 10 acquires print data including height information of a three-dimensional object. Three-dimensional object formation using print data will be described below.

(Sheet Stacking Type Three-Dimensional Object Formation)

Now, individual processes of sheet stacking type three-dimensional object formation will be described.

Figure 5A:
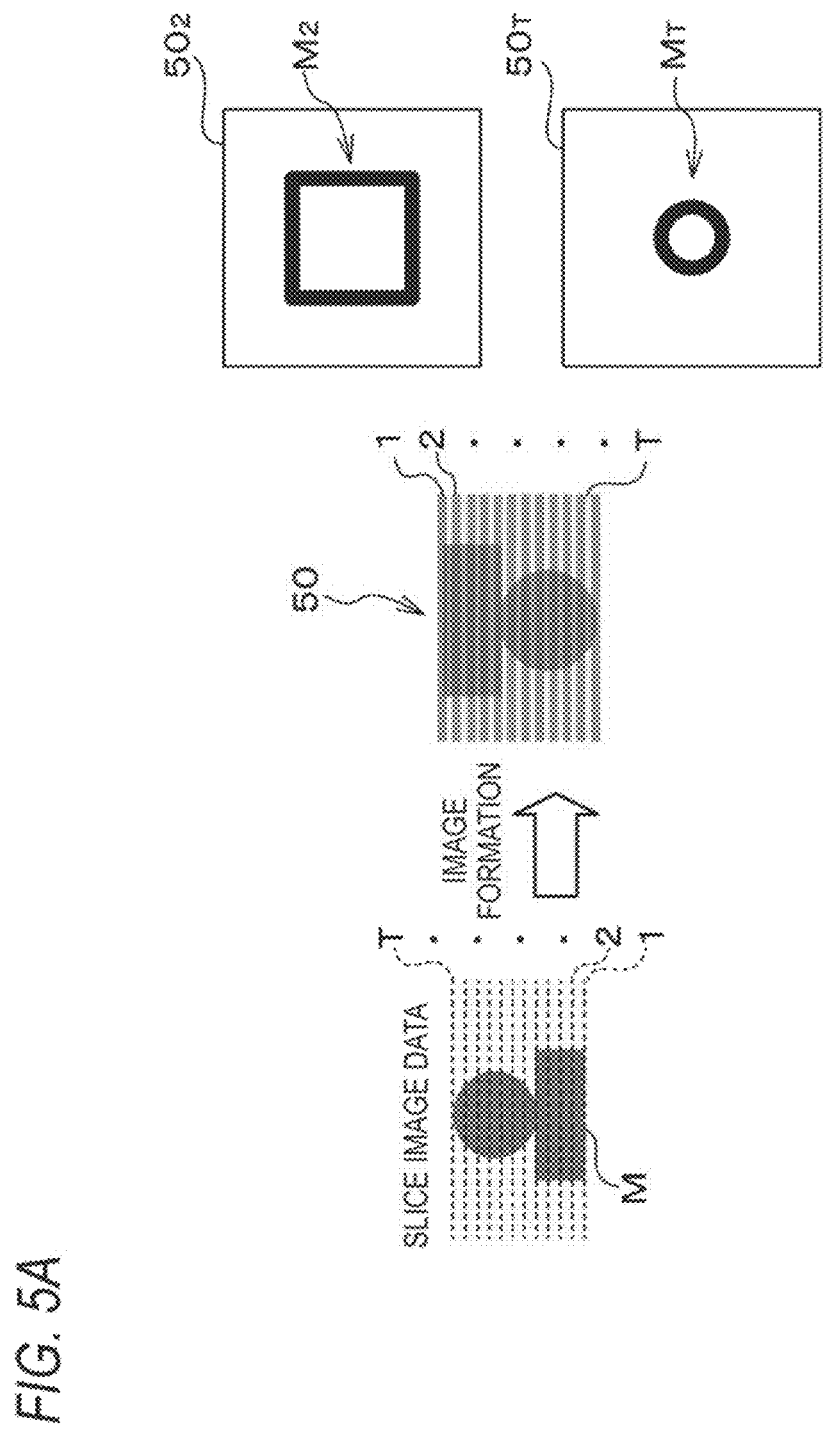
FIG. 5A is a schematic diagram illustrating an image forming process of sheet stacking type three-dimensional object formation.

FIG. 5A is a schematic diagram illustrating an image forming process of sheet stacking type three-dimensional object formation using three-dimensional data. FIG. 5B is a schematic diagram illustrating a post-processing process of the sheet stacking type three-dimensional object formation.

First, as shown in FIG. 5A, the information processing apparatus 10 generates two or more slice data items from three-dimensional data of a three-dimensional model M. In the present exemplary embodiment, T-number of slice data items from No. I to No. T are generated. The T-number of slice data items from No. I to No. T are converted into raster image data items to form T-number of slice images from No. I to No. T, respectively.

Next, as shown in FIG. 5A, the image forming apparatus forms the slice images on recording media. The image forming apparatus 12 forms the series of slice images on recording media 50, on the basis of the series of raster image data items. The two or more recording media $50_1$ to $50_T$ having the series of slice images formed thereon are stacked in the order of formation of the slice images. When "n" is one of No. I to No. T, slice image No. n is formed on the n-th recording medium $50_n$.

In the example shown in FIGS. 5A and 5B, the T-number of slice images from No. I to No. T are formed in the descending order from No. T to No. I. The recording medium $50_T$ having slice image No. T formed thereon is placed at the bottom, and the two or more recording media $50_1$ to $50_T$ are stacked in the descending order from No. T to No. I. Since the two or more recording media 50 to 50r are stacked in the descending order, in the subsequent post-processing process, the two or more recording media $50_1$ to $50_T$ are fed in the ascending order from No. I to No. T. In other words, the T-number of slice images are formed on the recording media 50 in reverse order to the post-processing order of the post-processing apparatus 14.

Next, as shown in FIG. 5B, the post-processing apparatus performs post-processing on the recording media 50 having the slice images formed thereon. In the present exemplary embodiment, the post-processing apparatus 14 includes a glue applying unit 20 configured to perform glue applying processes, a cutting-out unit 22 configured to perform cutting processes, and a crimping unit 24 configured to perform crimping processes. The glue applying unit 20, the cutting-out unit 22, and the crimping unit 24 are arranged sequentially along a conveyance path 26 for conveying recording media 50. The post-processing apparatus 14 acquires a series of control data according to the series of slice images, from the information processing apparatus 10.

«Slice Images»

Now, slice images will be described.

Figure 6A:
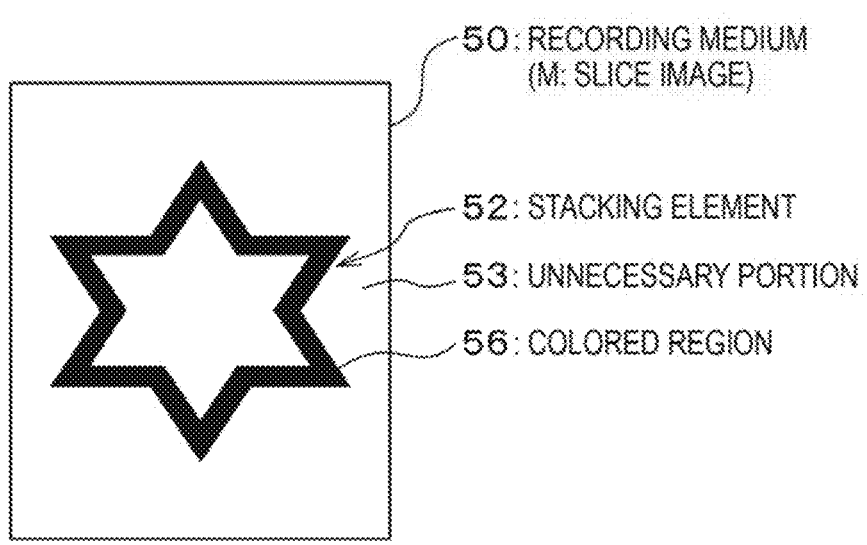
FIGS. 6A, 6B and 6C are schematic diagrams illustrating an example of a slice image.
Figure 6B:
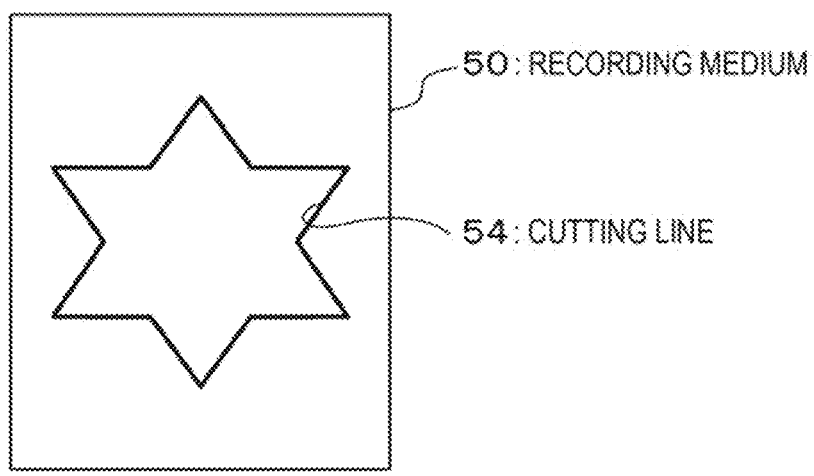
Figure 6C:
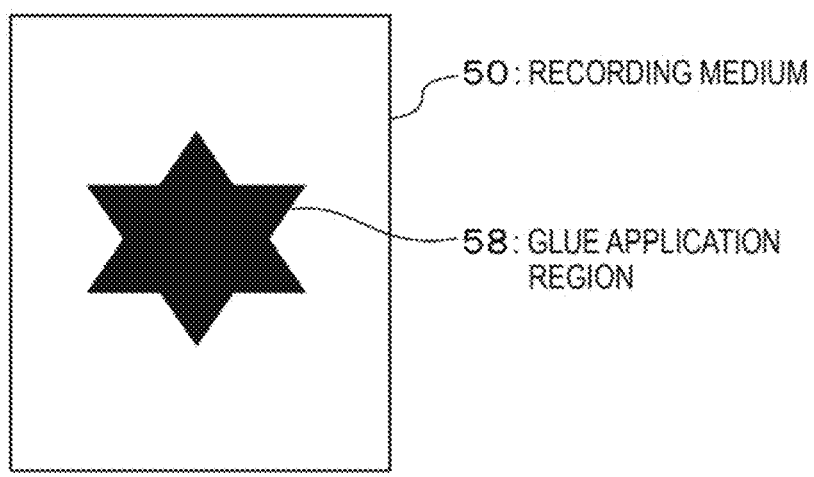

FIGS. 6A to 6C are schematic diagrams illustrating an example of a slice image. As shown in FIG. 6A, a slice image M on a recording medium 50 consists of a stacking element 52 to be stacked to form a three-dimensional object, and an unnecessary portion 53. At the periphery of the stacking element 52, a colored region 56 having a set width is provided. As shown in FIG. 6B, the outer circumferential line of the stacking element 52 is a cutting line 54 for cutting out the stacking element 52 from the recording medium 50.

As shown in FIG. 6C, a glue application region 58 is set inside the outer circumferential line (the cutting line 54) of the stacking element 52, for example, inside the colored region 56. Glue may be applied to the entire surface of the recording medium 50 including the unnecessary portion 53. However, if the glue application region 58 is set inside the outer circumferential line of the stacking element 52, as compared to the case of applying glue to the entire surface, a process of removing removal subjects D (see FIG. 5B) becomes easier. Also, if the glue application region 58 is set inside the outer circumferential line of the stacking element 52, when a crimping process is performed after glue application, glue does not protrude from the stacking element 52.

Also, setting of the width of the colored region 56, and setting of the width between the outer circumference of the glue application region 58 and the outer circumferential line of the stacking element 52 may be performed when a user gives a three-dimensional object formation instruction. In this case, for example, a setting screen may be displayed on the display 34 of the information processing apparatus 10 such that a user can set those widths by operating the operation unit 32. Alternatively, predetermined initial settings may be used.

Control data includes control data specifying the cutting line 54, and control data specifying the glue application region 58. For example, coordinates data of points existing on the path of the cutting line 54 is set as the control data specifying the cutting line 54. Also, coordinate data of points in the glue application region 58 is set as the control data specifying the glue application region 58.

From a stack of two or more recording media 50, the recording media 50 are fed to the glue applying unit 20, one by one. The glue applying unit 20 applies glue to a glue application region 58 of each recording medium 50 on the basis of control data specifying glue application regions 58. The glue applying unit 20 may have, for example, a glue ejecting head for ejecting glue. The glue ejecting head moves in a stacking direction (a z direction) and in in-plane directions (an x direction and a y direction) of recording media 50. The glue ejecting head ejects glue while scanning the glue application region 58 of each recording medium 50, whereby glue is applied to the glue application region 58. Each recording medium 50 on which a glue applying process has finished is fed to the cutting-out unit 22.

The cutting-out unit 22 makes cuts in each recording medium 50 along a cutting line 54 on the basis of control data specifying cutting lines 54. The cutting-out unit 22 may be, for example, a cutter having a blade edge. The blade edge of the cutter moves in the stacking direction (the z direction) and in the in-plane directions (the x direction and the y direction) of recording media 50. The cutting-out unit 22 moves the blade edge of the cutter in the in-plane directions while pressing the blade edge against each recording medium 50, such that cuts are made in the corresponding recording medium 50.

The position of the blade edge of the cutter in the stacking direction can be adjusted, to determine the depth of cuts. The depth of cuts may be set to such a depth that cuts do not reach rear surfaces. Since stacking elements are not cut out from recording media 50, missing of stacking elements 52 in conveying processes is avoided.

The cutter needs only to have a function of making cuts in recording media 50 along cutting lines 54, and is not limited to mechanical cutters configured to press their blade edges. For example, ultrasonic cutters configured to make cuts by radiating an ultrasonic wave and laser cutters configured to make cuts by radiating laser beams may be used.

Also, the cutting-out unit 22 may form holes in each recording medium 50 along a cutting line 54, instead of making cuts. In the case of forming holes, since each stacking element is connected to a corresponding recording medium 50, missing of stacking elements 52 in conveying processes is further avoided.

Each recording medium 50 on which a cutting process has finished is fed to the crimping unit 24. The crimping unit 24 sequentially stacks fed recording media 50. At this time, the two or more recording media $50_1$ to $50_T$ are stacked in the ascending order from No. I to No. T. Subsequently, the crimping unit 24 applies a pressure to the stack of the two or more recording media 50 along the stacking direction, thereby crimping the two or more recording media 50. By crimping, each of the two or more recording media $50_1$ to $50_T$ having glue on them is bonded to recording media 50 on or under it by the glue application regions 58.

Although each recording medium 50 on which a cutting process has finished consists of a stacking element 52 to be stacked to form a three-dimensional object P and an unnecessary portion 53, it is stacked as a whole with the unnecessary portion 53. The unnecessary portions 53 of the recording media 50 become a supporting member supporting the three-dimensional object P which is a stack of the stacking elements 52. After the crimping process of the crimping unit 24 finishes, the removal subjects D are removed, whereby the stack of the stacking elements 52 of the recording media 50 are separated as the three-dimensional object P.

«Control Data»

Now, an example of control data will be described.

Figure 7A:
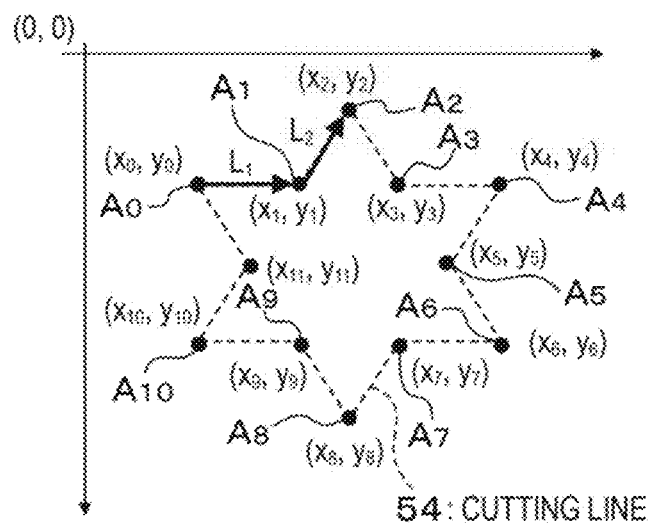
FIGS. 7A and 7B are schematic diagrams illustrating examples of control data specifying a cutting line.
Figure 7B:
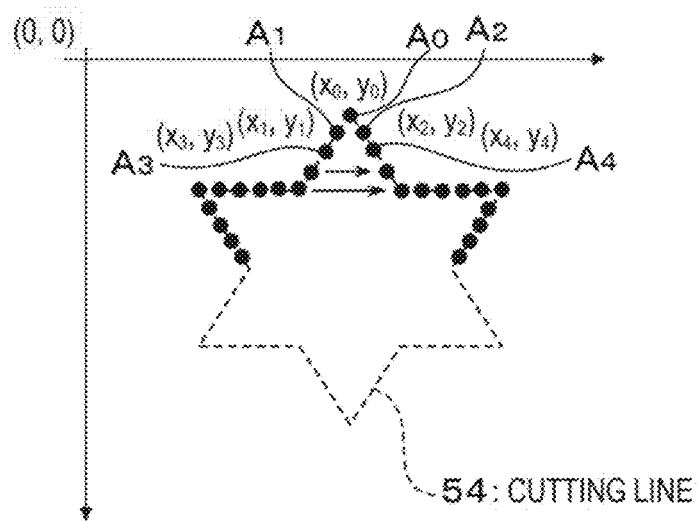
Figure 8A:
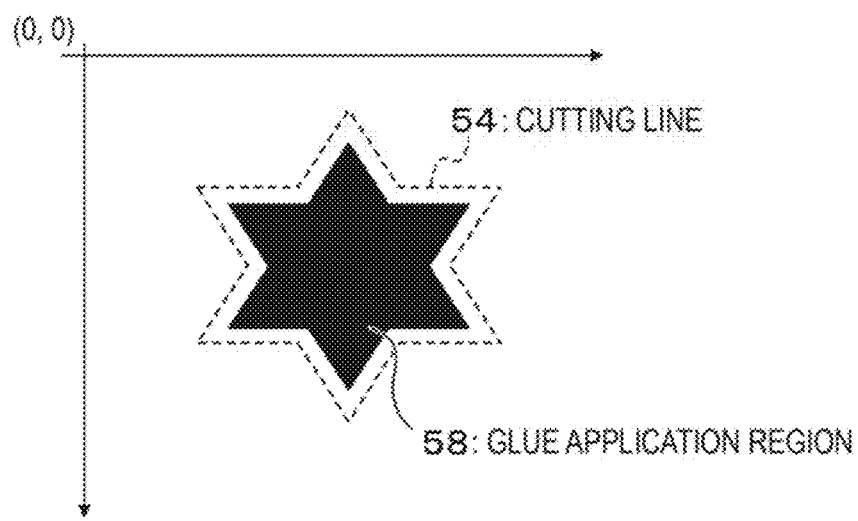
FIGS. 8A and 8B are schematic diagrams illustrating examples of control data specifying a glue application region.
Figure 8B:
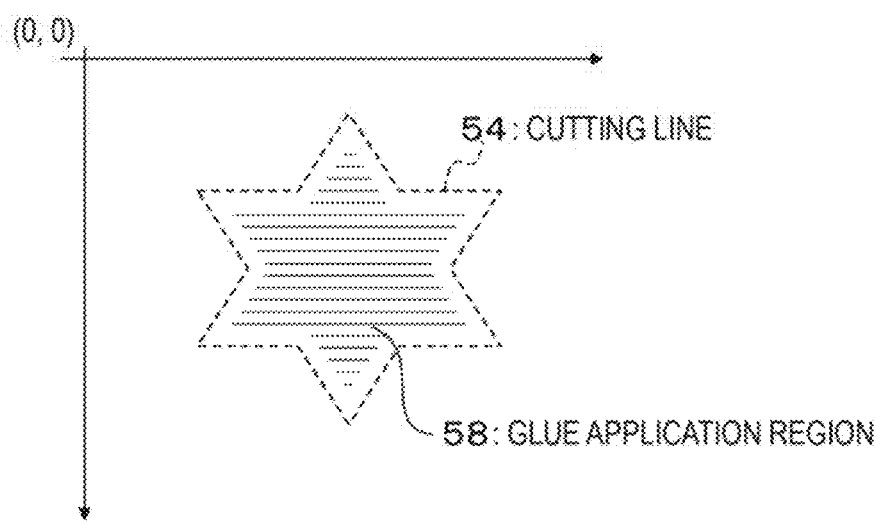

FIGS. 7A and 7B are schematic diagrams illustrating an example of control data specifying a cutting line. FIGS. 8A and 8B are schematic diagrams illustrating an example of control data specifying a glue application region. As will be described below, stacking data includes coordinate data of vertexes of intersection areas at which polygons and slice planes intersect. The intersection areas exist along the outer circumferential lines of stacking elements 52. Therefore, as shown in FIG. 7A, data on coordinates of points existing on the path of a cutting line 54, such as coordinates $(x_0, y_0)$ of a point A0, becomes control data specifying the cutting line 54.

In the example shown in FIG. 7A, a star-shaped stacking element 52 has eleven vertexes A0 to A10. For example, in the case where the point A0 is designated as a start point, if the individual points are traced in the order of A0, A1, A2, A3, A4, A5, A6, A7, A8, A9, and A10, the cutting line 54 is specified.

Also, as shown in FIG. 7B, in the case of forming holes, data on coordinates of hole formation points existing on the path of a cutting line 54 becomes control data specifying the cutting line 54. For example, in the case where a point A0 is designated as a start point, if the individual hole formation points are traced in the order of A0, A1, A2, A3, A4, and so on, the cutting line 54 is specified.

As shown in FIG. 8A, data on coordinates of individual points of a glue application region 58 becomes control data specifying the corresponding glue application region 58. Each glue application region 58 is set inside the outer circumferential line of a corresponding stacking element 52 so as to be slightly smaller than the corresponding stacking element 52. Each glue application region 58 may be specified by reducing the size of an image of a corresponding stacking element 52. In this case, each glue application region 58 is arranged such that the center of an image of an image of a corresponding stacking element 52 and the center of the corresponding glue application region 58 coincide with each other. Data on coordinates of individual points of a glue application region 58 is obtained from the width between the outer circumferential line of the corresponding glue application region and the outer circumferential line of a corresponding stacking element 52 and data on coordinates of points existing on the path of a corresponding cutting line 54.

Also, as shown in FIG. 8B, it is not necessarily needed to add glue all over each glue application region 58. Glue may be applied to some parts of each glue application region 58 without applying past to some parts of the corresponding glue application region 58. Also, the density of glue does not necessarily need to be constant all over the glue application regions 58. In the case where the density of glue can be changed, the density of glue for the peripheries of the glue application regions 58 may be set to be higher than the density of glue for the center parts of the glue application regions 58.

The origin point of the control data specifying the cutting lines 54 and the origin point of the control data specifying the glue application regions 58 are aligned with the origin point of image formation positions for forming the slice images. In the case where the post-processing apparatus 14 has an image reading function, in the image forming apparatus 12, on each recording medium 50, a mark image representing the position of the origin point of the control data may be formed together with a slice image, such that the post-processing apparatus 14 can acquire information on the position of the origin point of the control data by reading the mark image.

However, the format of the control data is not limited to coordinate data. For example, image data such as binary raster image by which the cutting lines 54 and the glue application regions 58 can be expressed as figures or images may be used. In the case where the control data is binary raster image data, in the example shown in FIG. 6B, the values of pixels of the cutting line 54 are expressed as 1, and the values of pixels of the other region are expressed as 0. In the example shown in FIG. 6C, the values of pixels of the glue application region 58 are expressed as 1, and the values of pixels of the other region are expressed as 0. For example, with respect to pixels having the value of 1, the glue ejecting head of the glue applying unit 20 ejects glue onto recording media 50. Meanwhile, with respect to pixels having the value of 0, the glue ejecting head does not eject past onto recording media 50.

<Three-Dimensional Object Formation Using Print Data>

Now, three-dimensional object formation using print data will be described.

Figure 9:
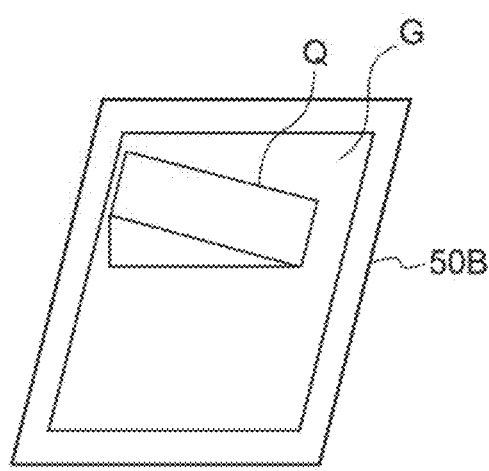
FIG. 9 is a view illustrating an example of a three-dimensional object which is formed by three-dimensional object formation using print data.

FIG. 9 is a view illustrating an example of a three-dimensional object which can be formed by three-dimensional object formation using print data. In three-dimensional object formation using print data, a two-dimensional image G is formed on a recording medium 50B which is a mount. In the present exemplary embodiment, a mount is a recording medium on which a three-dimensional object is superimposed (affixed). A mount needs only to be a recording medium fulfilling the role of a base, and does not necessarily need to be thick paper.

A recording medium 50B which is a mount is written as a recording medium 50B so as to be distinguished from other recording media 50 to be stacked. Here, a two-dimensional image is an image which is formed on a sheet-like recording medium such as paper. An image which is formed on a recording medium which is a mount is referred to as a two-dimensional image in order to imply that the corresponding image does not originally show height. Although images which are formed on other recording media are also two-dimensional images, as will be described below, they are referred to as slice images or stacking elements (images of stacking elements), so as to be distinguished from two-dimensional images which are formed on mounts.

On recording mediums 50B having two-dimensional images G formed thereon, three-dimensional objects Q can be formed by sheet stacking type three-dimensional object formation described above. Three-dimensional objects Q are not restricted to specific shapes, and may have any shapes. For example, on a recording medium 50B having a two-dimensional image G of a document formed thereon, a Braille translation (raised dots) of the document is formed as three-dimensional objects Q.

In the present exemplary embodiment, an example in which a recording medium 50B having a two-dimensional image G formed thereon is used as a mount and a three-dimensional object Q is formed on the mount will be described. Information on the height of the three-dimensional object at the position of each pixel of the two-dimensional image needs only to be acquired from print data. However, the present invention is not limited to this example. For example, three-dimensional objects Q may be formed without using mounts. Also, even in the case of forming a three-dimensional object Q on a recording medium 50B which is a mount, a two-dimensional image G does not necessarily need to be formed on the recording medium 50.

(Print Data for Three-Dimensional Object Formation)

Now, print data for three-dimensional object formation will be described.

In three-dimensional object formation using print data, print data includes height information of a three-dimensional object as information for forming the three-dimensional object. Also, in print data, designation information associated with designated attributes is included. For example, options such as an option "THREE-DIMENSIONALLY FORM DESIGNATED SPECIAL-COLOR PARTS" are prepared on a print setting screen which can be operated in another device capable of generating print data, and designation is performed such that designated attributes are associated with height information.

Here, attributes which are associated with height information are defined as attributes for object formation. Attributes are attributes for two-dimensional images, and mean the colors, densities, and so on of individual pixels. Attributes for object formation can be selected from attributes prepared for two-dimensional images, without adding new attributes. Also, attributes for object formation are selected so as not to affect two-dimensional images which are formed in the case where it is required to form two-dimensional images. For example, in the case where a certain attribute is not used for image formation, even through the corresponding attribute is changed according to height information, this change does not affect two-dimensional images to be formed. Also, in the case where it is not required to form two-dimensional images, even though attributes for two-dimensional images are changed, any problem is not caused.

For example, in the option "THREE-DIMENSIONALLY FORM DESIGNATED SPECIAL-COLOR PARTS", an attribute "KIND (COLOR) OF SPECIAL COLOR" or "DENSITY OF SPECIAL COLOR" (hereinafter, referred to as "SPECIAL-COLOR DENSITY") is designated as an attribute for object formation. Print data is generated so as to include objects for which a special color has been set. In other words, three-dimensional objects become objects for which the special color has been set. In the first exemplary embodiment, the case where print data includes an object for which the special color has been set will be described.

Here, the special color means a certain color different from fundamental colors which are used to form images in two or more colors. In general, four colors, i.e. cyan (C), magenta (M), yellow (Y), and black (K) are used as fundamental colors. The color of each pixel is expressed by combining densities of the fundamental colors. For this reason, a color which is hardly expressed by mixing the fundamental colors is set as the special color. For example, white, transparency, or the like can be used as the special color.

In the present exemplary embodiment, the special color is designated; however, a color other than the special color may be set as long as the corresponding color does not affect image formation. For example, a fundamental color may be set. An example in which a fundamental color is set will be described below as a modification.

With reference to FIG. 9, a method of associating height information with an attribute for object formation will be described in detail. Here, the case where an attribute for object formation is "SPECIAL-COLOR DENSITY" will be described. Also, the height of a three-dimensional object is a physical amount representing the distance from the bottom of the three-dimensional object to the top.

In the example shown in FIG. 9, on a recording medium 50B having a two-dimensional image G formed thereon, a three-dimensional object Q is formed. In this case, of the area where the two-dimensional image G is formed, in an area R where the three-dimensional object Q is formed, an object for which the special color has been set is arranged. Also, in the area where the object for which the special color has been set is arranged, other objects such as characters, figures, and patterns may be arranged so as to overlap the three-dimensional object Q. Together with the three-dimensional object Q, images such as characters, figures, and patterns can be formed.

Figure 10:
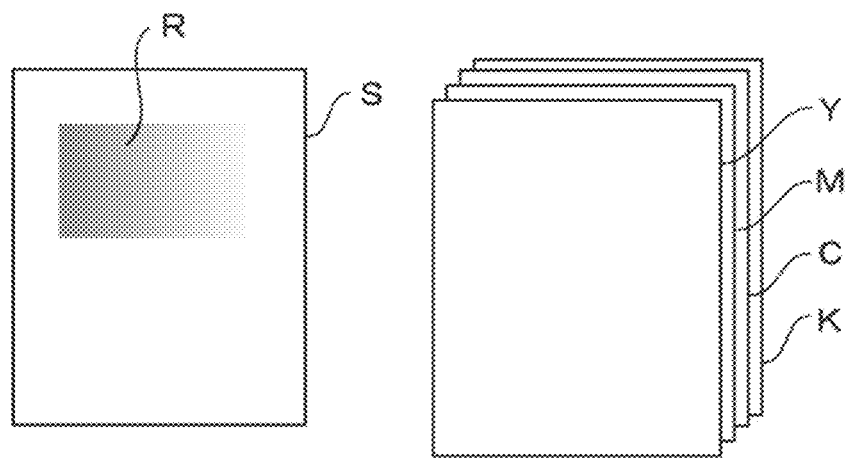
FIG. 10 is a view illustrating an example of a special-color plate.

FIG. 10 is a view illustrating an example of a special-color plate. In print data of one page for forming the two-dimensional image, fundamental-color image data CMYK and a special-color plate S are included. The special-color plate is data representing special-color densities representing the heights of the three-dimensional object at the positions of individual pixels of the two-dimensional image. Image formation using the special color is not performed. In the case where it is not required to form two-dimensional image, the fundamental-color image data is unnecessary, and only the special-color plate (height information) needs to be included.

Each of the positions of the pixels of the area R of the two-dimensional image G is associated with a special-color density according to the height of the three-dimensional object. A correspondence relationship between height and special-color density is determined in advance. With reference to the correspondence relationship between height and special-color density, the density of the special color at the position of each pixel of the area R of the two-dimensional image G is set to a density according to the height of the three-dimensional object at the corresponding pixel position. Also, with respect to the position of each pixel which is not associated with any special-color density, since it is not required to form the three-dimensional object, the density of the special color is set to zero, and the height of the three-dimensional object also is set to zero.

Figure 11:
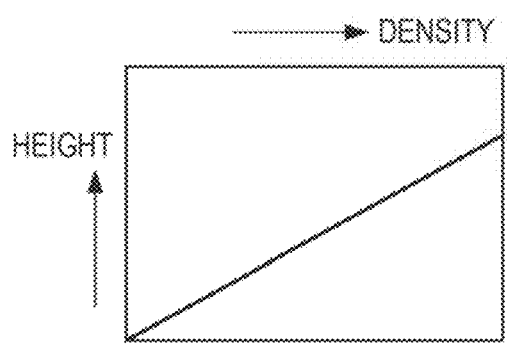
FIG. 11 is a view illustrating an example of the correspondence relationship between height and special-color density.

FIG. 11 is a view illustrating an example of the correspondence relationship between height and special-color density. In the example shown in FIG. 11, the correspondence relationship between the height of the three-dimensional object and the density of the special color is a proportional relationship in which the height is proportional to the special-color density. For example, densities of each color are expressed as 8-bit pixel values (from 0 to 255). In the case of expressing densities of the special color as the pixel values of the special-color plate, a pixel value corresponding to a height of 0 mm is expressed as 0, and a pixel value corresponding to a height of 20 mm is expressed as "255", such that the correspondence relationship between heights and pixel values becomes a proportional relationship. In this case, a predetermined density (so-called offset) may be added to the densities of the special color. For example, a pixel value corresponding to the height of 0 mm may be set to 5.

Also, the correspondence relationship between height and special-color density is acquired in advance by the information processing apparatus 10 before information processing related to three-dimensional object formation using the print data is performed. For example, the correspondence relationship between height and special-color density is notified, together with an instruction for three-dimensional object formation using the print data, to the information processing apparatus 10. The acquired correspondence relationship is stored in advance in a storage device such as the non-volatile memory 30D of the information processing apparatus 10, in advance.

As described with reference to FIGS. 9 to 11, in the first exemplary embodiment, print data for three-dimensional object formation includes height information on a three-dimensional object under the following conditions (1) to (4). (1) A special-color plate is included as a two-dimensional image using one color in the print data. (2) An attribute for object formation is "SPECIAL-COLOR DENSITY". (3) The height of the three-dimensional object is a physical amount representing the distance from the bottom of the three-dimensional object to the top. (4) A correspondence relationship between height and special-color density is set to a proportional relationship in which height is proportional to special-color density.

(Function of Information Processing Apparatus)

Now, the functional configuration of the information processing apparatus will be described.

Figure 12:
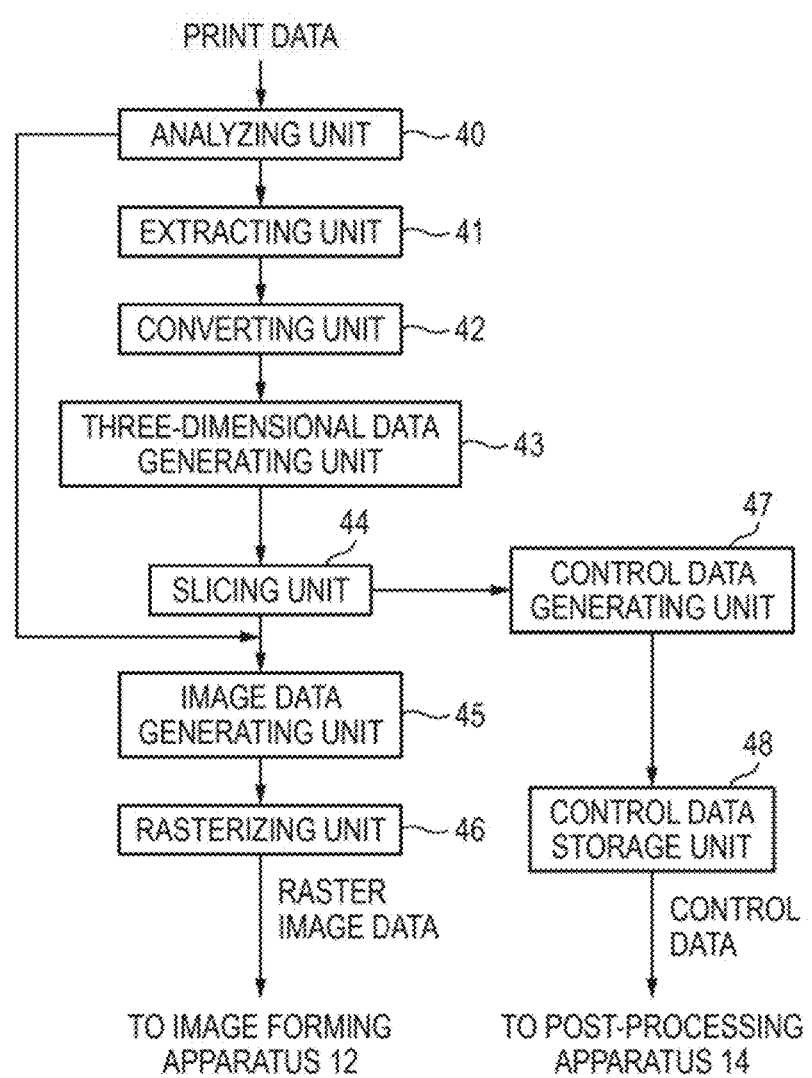
FIG. 12 is a functional block diagram illustrating an example of the functional configuration of the information processing apparatus related to three-dimensional object formation using print data.

FIG. 12 is a functional block diagram illustrating an example of the functional configuration of the information processing apparatus related to three-dimensional object formation using print data. The information processing apparatus 10 includes a three-dimensional data processing unit (not shown in the drawings) configured to receive three-dimensional data and process the received three-dimensional data, thereby generating slice data and control data, besides functional components shown in FIG. 12; however, a description of the three-dimensional data processing unit will not be made here.

As shown in FIG. 12, the information processing apparatus 10 includes an analyzing unit 40, an extracting unit 41, a converting unit 42, a three-dimensional data generating unit 43, a slicing unit 44, an image data generating unit 45, a rasterizing unit 46, a control data generating unit 47, and a control data storage 48. The analyzing unit 40 is an example of a receiving unit. Also, each of the image data generating unit 45 and the rasterizing unit 46 is an example of an output unit.

If the analyzing unit 40 receives print data, it analyzes whether the print data includes height information. In the case where height information is included, the analyzing unit 40 notifies the received print data to the extracting unit 41 in order to form a three-dimensional object on the basis of the print data.

As described above, in print data for three-dimensional object formation, designation information specifying association of height information with a designated attribute, such as "THREE-DIMENSIONALLY FORM DESIGNATED SPECIAL-COLOR PARTS", is included. In the case where the print data includes designation information, the print data includes height information. In the case where the print data does not include designation information, the print data does not include height information.

If the extracting unit 41 receives the print data including the height information, it extracts an attribute for object formation associated with the height information, from the received print data.

As described above, the attribute for object formation is "SPECIAL-COLOR DENSITY", and the height information is included as special-color densities in the print data. Therefore, the extracting unit extracts the special-color densities at the positions of individual pixels of a corresponding two-dimensional image.

The converting unit 42 converts the special-color density at the position of each pixel into the height of the three-dimensional object at the corresponding pixel position, with reference to the correspondence relationship between height and special-color density.

The three-dimensional data generating unit 43 generates three-dimensional shape data representing the three-dimensional object, from the heights of the three-dimensional object at the positions of the individual pixels.

The three-dimensional shape data is data representing a three-dimensional model as a set of unit elements. For example, in three-dimensional shape data having OBJ format, a three-dimensional model is expressed as a set of polygons which are triangles. In the three-dimensional shape data, a file dealing with shape data is included. In this file, coordinate data items (for example, data items on the coordinates of vertexes of polygons) are defined in association with the individual unit elements, respectively.

Also, in association with the individual unit elements, color information items may be defined. Colors which are associated with the individual unit elements are set as colors to be imparted to the three-dimensional object. For example, the special color used in association of the height information may be set as a color to be imparted to the three-dimensional object. Also, a color designated for an object to be superimposed on the object for which the special color has been designated may be set as a color to be imparted to the three-dimensional object.

As shown in FIG. 9, in the present exemplary embodiment, a ground plane on which the three-dimensional object Q is placed is referred to as an X-Y plane. Also, a direction in which recording media are stacked in order to form the three-dimensional object Q (a stacking direction) is referred to as a Z-axis direction. Therefore, the heights of the three-dimensional object Q at the positions of the individual pixels are converted into coordinate data of the unit elements in the three-dimensional space, whereby three-dimensional shape data is generated.

The slicing unit 44 generates slice data from the three-dimensional shape data. The slicing unit sets a slice plane parallel with the ground plane (the X-Y plane). The slicing unit shifts the slice plane along the stacking direction (the Z-axis direction) at predetermined intervals, and generates slice data whenever it shifts the slice plane. In the present exemplary embodiment, the three-dimensional shape is sliced in directions perpendicular to the stacking direction, at intervals according to the thickness of recording media.

The slice data represents images of cross sections which can be obtained by slicing the three-dimensional object with the slice plane. Specifically, the slice data represents images of cross sections of the three-dimensional object according to the coordinate data of the unit elements such as polygons at intersection areas where the unit elements and the slice plane intersect with each other.

The image data generating unit 45 converts the slice data into image data having a file format such as JPEG The generated image data on the slice images is output, together with the original image data included in the print data, to the rasterizing unit 46. The rasterizing unit 46 rasterizes the image data, thereby generating raster image data. Raster image data on the two-dimensional image and raster image data on the slice images are output to the image forming apparatus 12.

By the way, the image data generating unit 45 may be configured to generate intermediate data.

Here, intermediate data is data on a section on each scan line of raster scanning occupied by each object (such as a character font, a graphic figure, or image data) which is an image element constituting an image of a page. Section data is data representing a section on one scan line occupied by an object. Section data is expressed, for example, as a set of the coordinates of both ends of a corresponding section. Also, section data includes information defining pixel values of individual pixels included in a corresponding section.

In the case of generating intermediate data, the image data generating unit 45 converts the print data into print data including image data on the slice images. The print data obtained by conversion further includes pages for forming the slice images. Subsequently, the image data generating unit 45 converts the obtained print data into intermediate data, and outputs the intermediate data to the rasterizing unit 46. The rasterizing unit 46 rasterizes the intermediate data. The raster image data on the two-dimensional image and the raster image data on the slice images are output to the image forming apparatus 12.

Also, the slicing unit 44 outputs the slice data to the control data generating unit 47.

The control data generating unit 47 generates control data from the slice data obtained in the slicing unit 44. Also, in the case where it is required to form a three-dimensional object on a recording medium which is a mount, the control data generating unit generates control data for applying glue to the recording medium which is a mount. For example, the control data related to the recording medium which is a mount may be generated from slice data corresponding to a stacking element to be stacked first.

The generated control data is stored in the control data storage 48 in association with identification information (for example, numbers representing the stacking order). Thereafter, if a post-processing start instruction is received from the user, the control data is read out from the control data storage 48 and is output to the post-processing apparatus 14.

Meanwhile, in the case where the print data received by the analyzing unit 40 does not include height information, the analyzing unit 40 outputs the received print data to the rasterizing unit 46, which generates raster image data corresponding to the print data. In other words, the information processing apparatus 10 performs normal information processing according to an image formation instruction.

The functions of the analyzing unit 40, the extracting unit 41, the converting unit 42, the three-dimensional data generating unit 43, the slicing unit 44, the image data generating unit 45, the rasterizing unit 46, and the control data generating unit 47 described above are executed by the CPU 30A.

In the first exemplary embodiment, the information processing apparatus 10 is configured to include the control data storage 48; however, a storage for storing control data may be arranged outside the information processing apparatus 10. For example, the storage may be provided in the post-processing apparatus 14. In this case, the control data generated in the information processing apparatus 10 is stored in the storage of the post-processing apparatus 14, and is read out from the storage of the post-processing apparatus 14, and is used.

Also, for example, as the storage for storing control data, a portable computer-readable recording medium such as a USB (Universal Serial Bus) memory may be used. In this case, the control data generated in the information processing apparatus 10 is stored in the portable computer-readable recording medium. The stored control data is read out from the portable computer-readable recording medium by a data reading mechanism such as a drive provided in the information processing apparatus 10 or the post-processing apparatus 14, and is used.

(Information Processing Program)

Now, an information processing program will be described.

Figure 13:
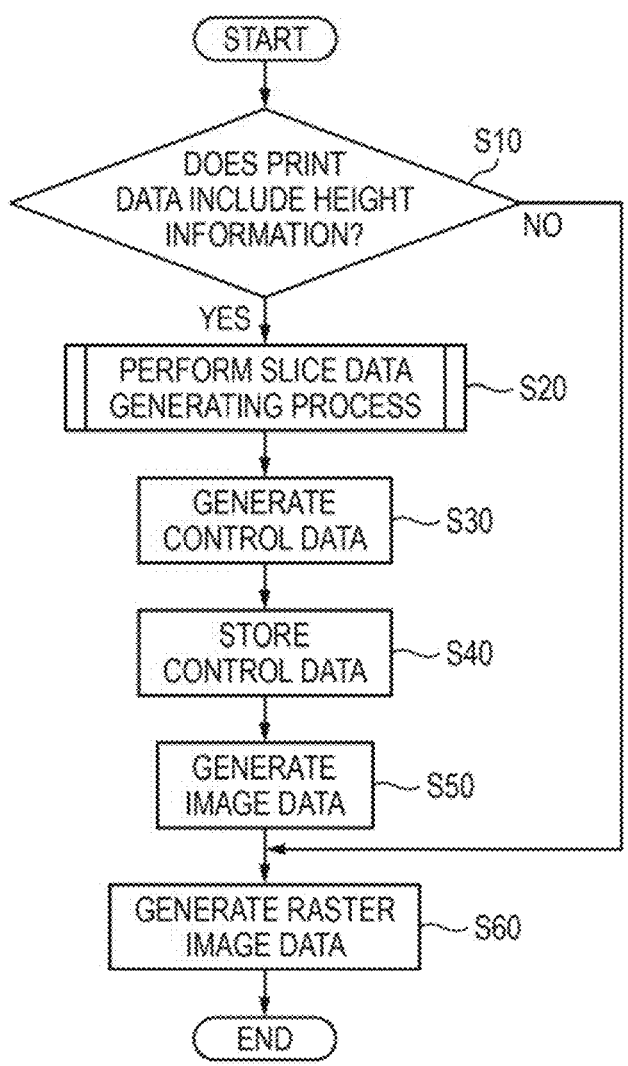
FIG. 13 is a flow chart illustrating an example of the proceeding procedure of an information processing program according to a first exemplary embodiment.

FIG. 13 is a flow chart illustrating an example of the proceeding procedure of an information processing program according to the first exemplary embodiment. The information processing program is stored in the ROM 30B of the information processing apparatus 10. If an image formation instruction is received from the user, the CPU 30A of the information processing apparatus 10 reads out the information processing program from the ROM 30B and executes the information processing program.

In STEP S10, the CPU determines whether print data includes designation information specifying association of height information with a designated attribute. In the case where the print data includes designation information, the CPU proceeds to STEP S20. Meanwhile, in the case where the print data does not include designation information, the CPU proceeds to STEP S60. Next, in STEP S20, the CPU performs a slice data generating process of generating slice data to be used for three-dimensional object formation, from the height information included in the print data.

Next, in STEP S30, the CPU generates control data from the slice data. Subsequently, in STEP S40, the CPU stores the control data generated in STEP S30, in the control data storage 48. Next, in STEP S50, the CPU generates image data on slice images from the slice data. Subsequently, in STEP S60, the CPU generates raster image data from the image data, and transmits the generated raster image data to the image forming apparatus 12, and finishes the information processing program shown in FIG. 13.

In the case where the CPU has proceeded from STEP S50 to STEP S60, in STEP S60, the CPU generates raster image data with respect to the image data on the two-dimensional image included in the print data and the image data on the slice images generated in STEP S50. Meanwhile, in the case where the CPU has proceeded from STEP S10 to STEP S60, since the received instruction is a normal image formation instruction, the CPU generates raster image data with respect to the image data included in the print data.

«Slice Data Generating Process»

Now, the slice data generating process which is performed in STEP S20 will be described.

Figure 14:
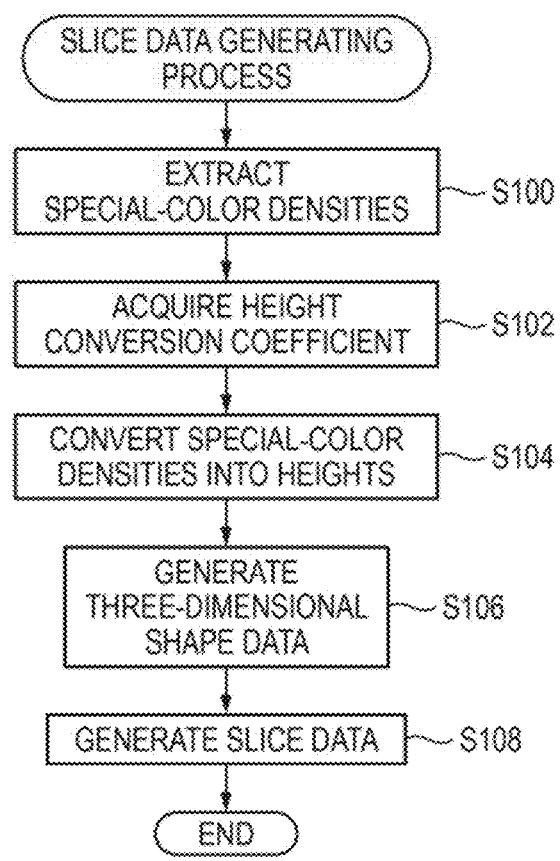
FIG. 14 is a flow chart illustrating an example of the proceeding procedure of a slice data generating process.

FIG. 14 is a flow chart illustrating an example of the proceeding procedure of the slice data generating process. First, in STEP S100, the CPU extracts special-color densities at the positions of pixels of the two-dimensional image, from the print data. Next, in STEP S102, the CPU acquires a height conversion coefficient for converting the special-color densities into heights. The height conversion coefficient is the constant of proportionality. Also, the height conversion coefficient is stored, as a correspondence relationship between height and special-color density, in a storage device such as the non-volatile memory 30D, in advance.

Next, in STEP S104, the CPU converts the special-color densities at the positions of the pixels into heights at the corresponding pixel positions, using the height conversion coefficient. In the first exemplary embodiment, since special-color density is proportional to height, the CPU converts the special-color densities into heights by multiplying the special-color densities by the height conversion coefficient. Next, in STEP S106, the CPU generates three-dimensional shape data representing the three-dimensional object to be formed on a recording medium, from the heights of the three-dimensional object at the positions of the pixels. Subsequently, in STEP S108, the CPU generates slice data from the three-dimensional shape data.

In the first exemplary embodiment, the example in which the information processing program is stored in the ROM 30B of the information processing apparatus 10 has been described, however, the information processing program may be stored in any other storage. For example, the information processing program may be stored in any other storage of the information processing apparatus 10, or may be stored in any other storage arranged outside the information processing apparatus 10.

Alternatively, the information processing program may be stored in a portable computer-readable recording medium such as a USB (Universal Serial Bus) memory. The information processing program may be read out from the portable computer-readable recording medium by a data reading mechanism such as a drive provided in the information processing apparatus 10.

(Image Formation and Three-Dimensional Object Formation)

In the first exemplary embodiment, the image forming apparatus 12 forms a two-dimensional image G on a recording medium 50B which is a mount. Also, the image forming apparatus 12 forms slice images on other recording media 50. The post-processing apparatus 14 performs post-processing on the recording medium 50B which is a mount and the recording media 50 having the slice images formed thereon, according to control data, thereby forming a three-dimensional object Q on the recording medium 50B which is a mount. On the recording medium 50B having the two-dimensional image G formed thereon, the three-dimensional object Q which is an object for which a special color has been designated is formed.

According to the first exemplary embodiment, from the special-color plate S shown in FIG. 10, the three-dimensional object Q shown in FIG. 9 is formed. As shown in FIG. 10, in the area R of the special-color plate S, the special-color densities of pixels consecutively increase as it goes from one end to the other end. The area R of the special-color plate S shows a so-called gradation image. In this case, as shown in FIG. 9, on the area R of the recording medium 50B having the two-dimensional image G formed thereon, the three-dimensional object Q whose height increases as it goes from one end to the other end is formed.

(First Modification)

In a first modification, another example of the special-color plate is shown.

Figure 15A:
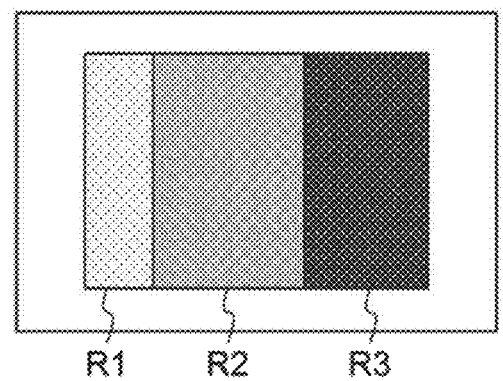
FIG. 15A is a view illustrating another example of the special-color plate.
Figure 15B:
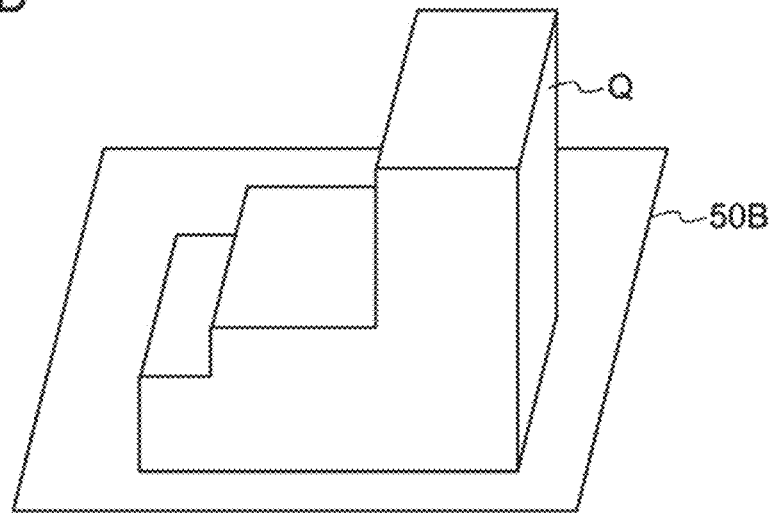
FIG. 15B is a view illustrating an example of a three-dimensional object which is formed from the special-color plate shown in FIG. 15A.

FIG. 15A is a view illustrating another example of the special-color plate. Also, FIG. 15B is a view illustrating an example of a three-dimensional object which can be formed from the special-color plate shown in FIG. 15A.

As shown in FIG. 15A, each of the positions of pixels of an area $R_1$ of the special-color plate is associated with a special-color density $D_1$, and each of the positions of pixels of an area $R_2$ of the special-color plate is associated with a special-color density $D_2$, and each of the positions of pixels of an area $R_3$ of the special-color plate is associated with a special-color density $D_3$. As shown in FIG. 11, the correspondence relationship between height and special-color density is a proportional relationship in which special-color density is proportional to height. The magnitude relationship of the special-color densities $D_1$, $D_2$, and $D_3$ is $D_1<D_1<D_3$. In this case, as shown in FIG. 15B, a three-dimensional object Q having three different heights is formed.

(Second Modification)

In a second modification, correction on the heights of the three-dimensional object at the positions of the pixels will be described.

With respect to the information processing apparatus 10 according to the first exemplary embodiment, the example in which the three-dimensional data generating unit 43 generates three-dimensional shape data by converting heights of a three-dimensional object obtained in the converting unit 42 into coordinate data of unit elements has been described. In an information processing apparatus 10 according to the second modification, a three-dimensional data generating unit 43 corrects coordinate data of unit elements before generating three-dimensional shape data. The three-dimensional data generating unit 43 generates three-dimensional shape data from the corrected coordinate data of the unit elements.

For example, in the case where a rounding instruction has been received from the user via an application or the operation unit 32, in STEP S106 shown in FIG. 14, the three-dimensional data generating unit corrects the coordinate data of the unit elements. Specifically, the three-dimensional data generating unit 43 extracts the vertexes of the three-dimensional object Q represented by the coordinate data, and approximates the contour of the three-dimensional object Q by a curve by applying a known interpolation method such as spline interpolation to the extracted vertexes.

Figure 16:
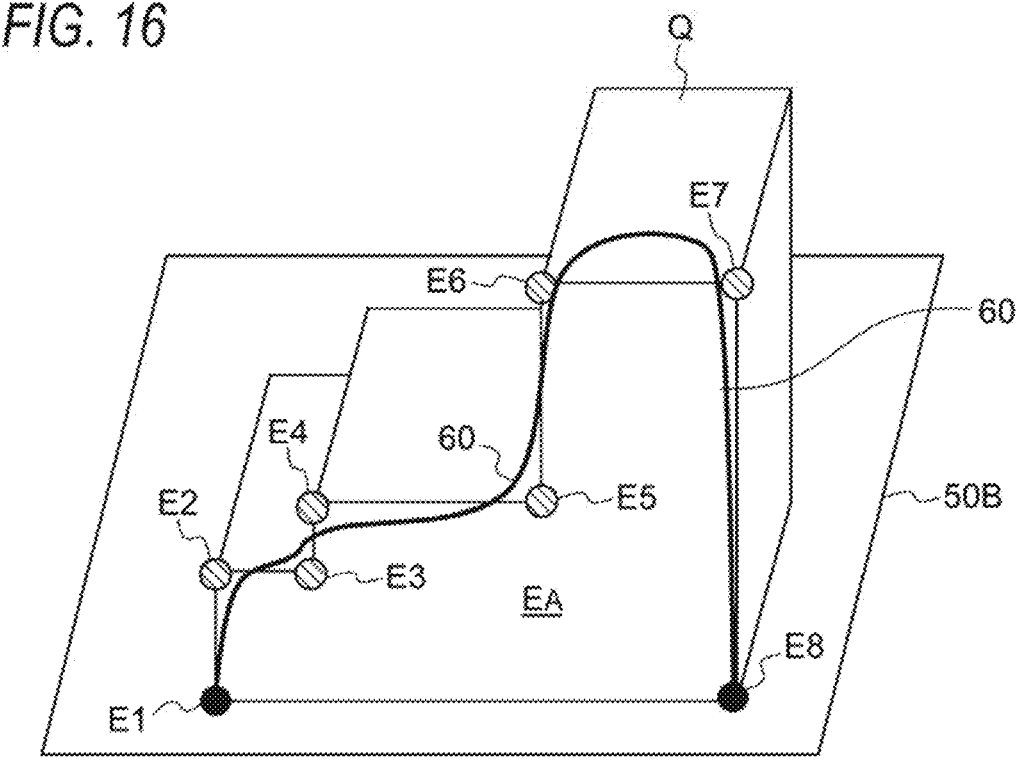
FIG. 16 is a view illustrating an example of a three-dimensional object to which rounding is applied.

FIG. 16 is a view illustrating an example of the three-dimensional object to which rounding is applied. In FIG. 16, vertexes of a side surface $E_A$ of the three-dimensional object Q before rounding are shown as vertexes $E_1$ to $E_8$. In this case, by performing rounding, the contour of the side surface $E_A$ is approximated by a curve shown as a curve 60. By approximating each line connecting vertexes of the three-dimensional object Q obtained before rounding by a curve in the above-described way, each contour of the three-dimensional object Q is approximated by a curve. Coordinate data of each unit element between neighboring vertexes is corrected.

Approximate intensity to be applied when approximating the contour of the three-dimensional object Q may be received from the user via the operation unit 32. Here, the approximate intensity is an index representing the degree of smoothness of the surface of the three-dimensional object Q. As higher approximate intensity is designated, a curve having a larger radius is set as a curve to be used for approximating. If a curve having a large radius is used for approximating, irregularity of the surface of the three-dimensional object Q decreases, and the surface of the three-dimensional object Q becomes smooth.

Second Exemplary Embodiment

With respect to the three-dimensional object forming system according to the first exemplary embodiment, the example in which special-color density is proportional to height and the correspondence relationship between height and special-color density is given as the height conversion coefficient has been described. In a three-dimensional object forming system according to a second exemplary embodiment, the correspondence relationship between height and special-color density is given as a height conversion table.

The three-dimensional object forming system according to the second exemplary embodiment has the same configuration as that of the three-dimensional object forming system according to the first exemplary embodiment except that the correspondence relationship between height and special-color density is given as a height conversion table. Therefore, components identical to those of the first exemplary embodiment are denoted by the same reference symbols, and a description thereof will not be made. Hereinafter, the difference from the first exemplary embodiment will be described.

(Print Data for Three-Dimensional Object Formation)

In the second exemplary embodiment, print data for three-dimensional object formation includes height information on a three-dimensional object under the following conditions (1) to (4). Conditions (1) to (3) are the same as those of the first exemplary embodiment. Condition (4) is different from that of the first exemplary embodiment. (1) A special-color plate is included as a two-dimensional image using one color in the print data. (2) An attribute for object formation is "SPECIAL-COLOR DENSITY". (3) The height of the three-dimensional object is a physical amount representing the distance from the bottom of the three-dimensional object to the top. (4) A correspondence relationship between height and special-color density is given as a height conversion table.

Figure 18:
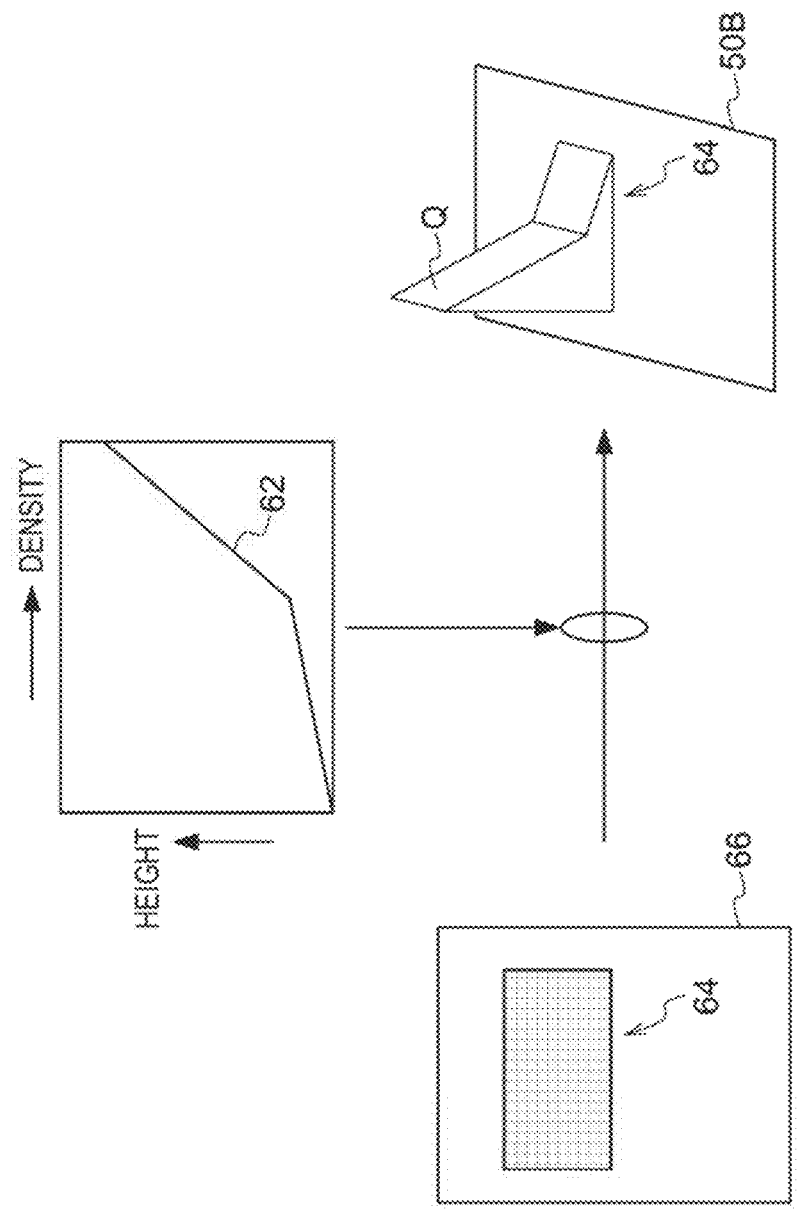
FIG. 18 is a schematic diagram illustrating an application example of a table representing a correspondence relationship between height and density.

FIG. 18 is a schematic diagram illustrating an application example of a table representing a correspondence relationship between height and density.

A height conversion table is a table representing a correspondence relationship between height and special-color density which is expressed, for example, by a graph 62 with density on a horizontal axis and the height of the three-dimensional object on a vertical axis, as shown in FIG. 18. Also, FIG. 11 is a view illustrating an example of the correspondence relationship between height and special-color density; however, the correspondence relationship shown in FIG. 11 may be used as a height conversion table of the second exemplary embodiment.

(Slice Data Generating Process)

Due to the above-described difference, the procedure of the slice data generating process which is performed in STEP S20 of FIG. 13 is also changed. Hereinafter, a slice data generating process according to the second exemplary embodiment will be described.

Figure 17:
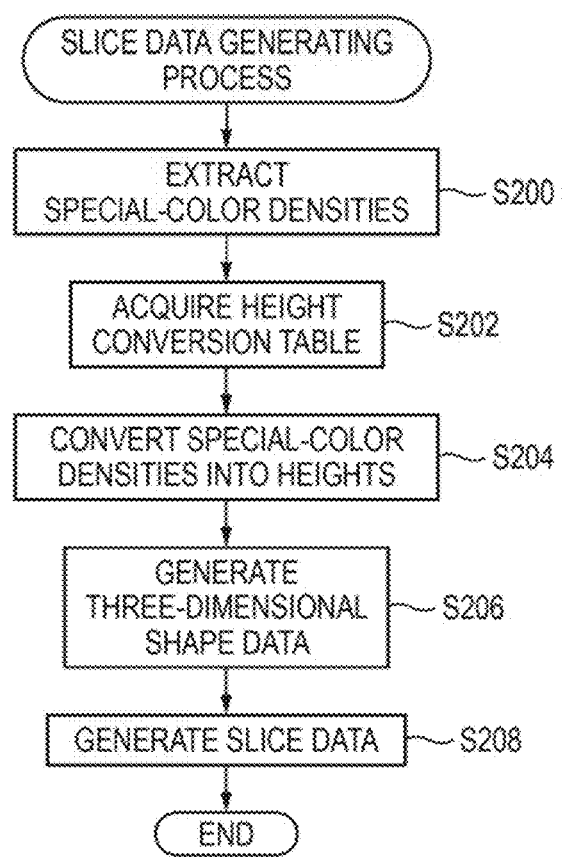
FIG. 17 is a flow chart illustrating an example of the proceeding procedure of a slice data generating process according to a second exemplary embodiment.

FIG. 17 is a flow chart illustrating an example of the proceeding procedure of the slice data generating process according to the second exemplary embodiment. First, in STEP S200, the CPU extracts special-color densities at the positions of pixels of a two-dimensional image, from the print data. Next, in STEP S202, the CPU acquires a height conversion table for converting the special-color densities into heights. The height conversion table is stored as a correspondence relationship between height and special-color density in a storage device such as the non-volatile memory 30D, in advance.

Next, in STEP S204, the CPU converts the special-color densities at the positions of the pixels into heights at the corresponding pixel positions, using the height conversion table. Subsequently, in STEP S206, the CPU generates three-dimensional shape data representing a three-dimensional object, from the heights of the three-dimensional object at the positions of the pixels. Next, in STEP S208, the CPU generates slice data from the three-dimensional shape data.

As shown in FIG. 18, in the second exemplary embodiment, a three-dimensional object Q is formed from a special-color plate 66. In an area 64 of the special-color plate 66, the special-color densities at the positions of individual pixels consecutively increase as it goes from one end to the other end. The area 64 of the special-color plate 66 shows a so-called gradation image. In this case, on the area 64 of a two-dimensional image (not shown in the drawings) formed on a recording medium 50B, the three-dimensional object Q having inclinations represented by the graph 62 representing the height conversion table.

(Third Modification)

In a third modification, the case where two or more height conversion tables have been registered will be described.

Figure 19:
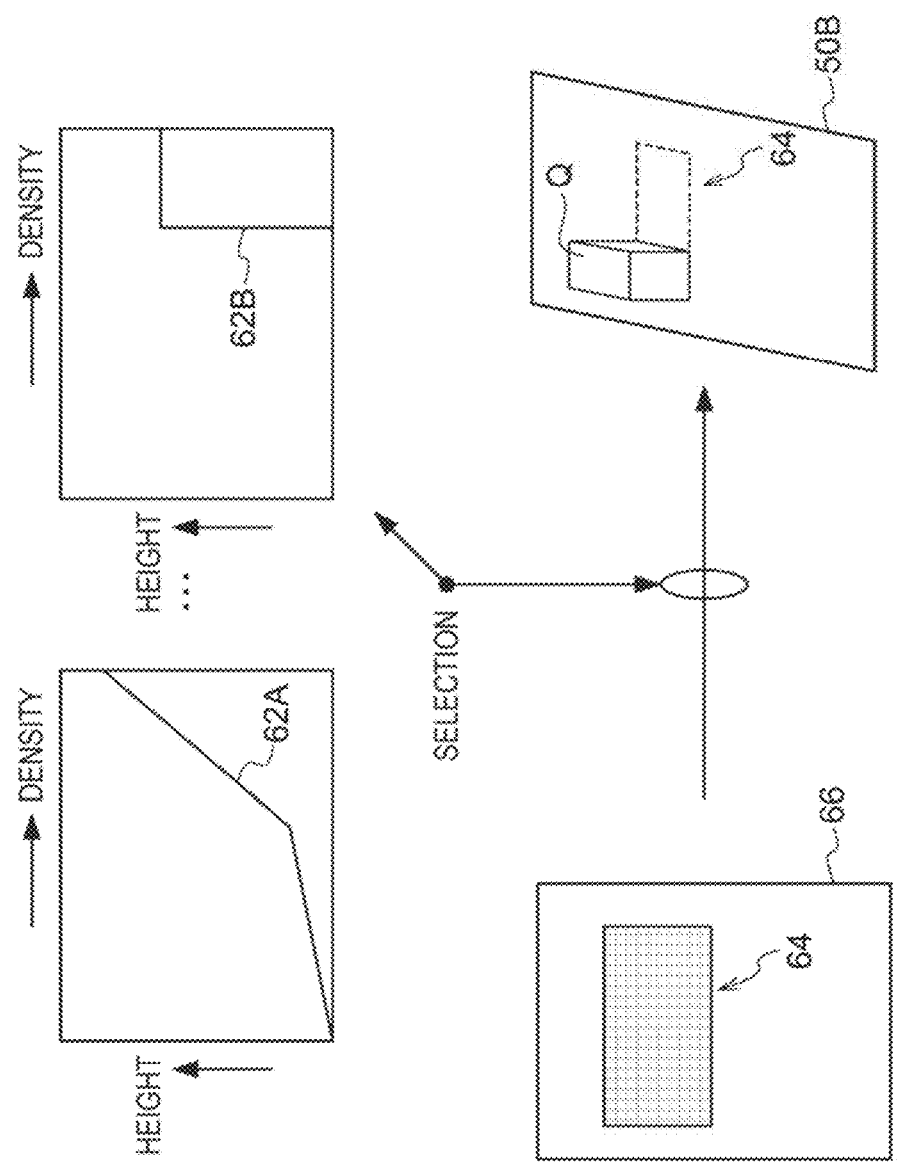
FIG. 19 is a schematic diagram illustrating an application example of two or more tables representing correspondence relationships between height and density.

FIG. 19 shows a schematic diagram illustrating an application example of two or more tables representing correspondence relationships between height and density. As shown in FIG. 19, in the third modification, two or more height conversion tables are stored as correspondence relationships between height and special-color density in a storage device such as the non-volatile memory 30D, in advance. The user selects one height conversion table to be used, via the operation unit 32.

In the example shown in FIG. 19, a situation in which a graph 62A and a graph 62B are registered as height conversion tables in the non-volatile memory 30D in advance and the user selects a height conversion table corresponding to the graph 62B is shown.

The area 64 of the special-color plate 66 shows a so-called gradation image, similarly to FIG. 18. The graph 62A is a height conversion table identical to the table represented by the graph 62 shown in FIG. 18, but the graph 62B is a height conversion table different from the table represented by the graph 62 shown in FIG. 18.

The special-color plate 66 shown in FIG. 19 is the same image as the special-color plate 66 shown in FIG. 18. However, since the height conversion table different from that of FIG. 18 is selected, on the area 64 of a recording medium 50B, a three-dimensional object Q having a cubic shape is formed according to the graph 62B. By switching between the height conversion tables, from the same special-color plate, different three-dimensional objects Q can be formed.

Third Exemplary Embodiment

With respect to the three-dimensional object forming system according to the first exemplary embodiment, the example in which "SPECIAL-COLOR DENSITY" is set as an attribute for object formation has been described. In a three-dimensional object forming system according to a third exemplary embodiment, the number of kinds of special colors is two or more, and "SPECIAL-COLOR DENSITY" is set as an attribute for object formation. Further, the two or more special colors are not used in image formation.

In the three-dimensional object forming system according to the third exemplary embodiment, the attribute for object formation is "KIND OF SPECIAL COLOR", and the correspondence relationship between height and the kinds of special colors is given as a height conversion table. The other configuration is the same as that of the three-dimensional object forming system according to the first exemplary embodiment. Therefore, components identical to those of the first exemplary embodiment are denoted by the same reference symbols, and a description thereof will not be made. Hereinafter, the difference from the first exemplary embodiment will be described.

(Print Data for Three-Dimensional Object Formation)

In the third exemplary embodiment, print data for three-dimensional object formation includes height information on a three-dimensional object under the following conditions (1) to (4). Conditions (1) and (3) are the same as those of the first exemplary embodiment. Conditions (2) and (4) are different from those of the first exemplary embodiment. (1) A special-color plate is included as a two-dimensional image using one color in the print data. (2) An attribute for object formation is "KIND OF SPECIAL COLOR". (3) The height of the three-dimensional object is a physical amount representing the distance from the bottom of the three-dimensional object to the top. (4) A correspondence relationship between height and the kinds of special colors is given as a height conversion table.

A height conversion table which can be used in the third exemplary embodiment is, for example, a table representing a correspondence relationship between height and the kinds of special colors, as shown in the following Table 1.

TABLE 1

| Kind of Special Color | Height |
|---|---|
| Special Color $X_1$ | A |
| Special Color $X_2$ | B |
| Special Color $X_3$ | C |

(Slice Data Generating Process)

Due to the above-described difference, the procedure of the slice data generating process which is performed in STEP S20 of FIG. 13 is also changed. Hereinafter, a slice data generating process according to the third exemplary embodiment will be described.

Figure 20:
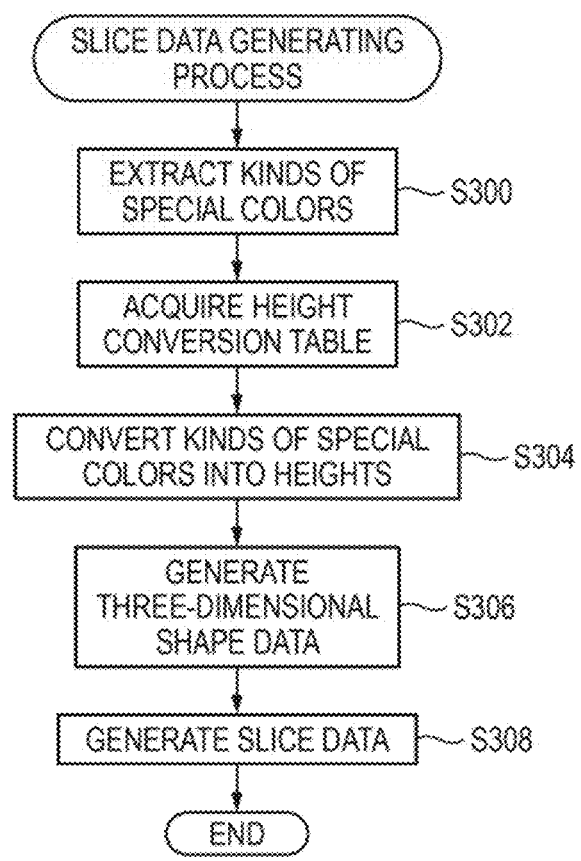
FIG. 20 is a flow chart illustrating an example of the proceeding procedure of a slice data generating process according to a third exemplary embodiment.

FIG. 20 is a flow chart illustrating an example of the proceeding procedure of the slice data generating process according to the third exemplary embodiment. First, in STEP S300, the CPU extracts the kinds of special colors at the positions of individual pixels of a two-dimensional image, from the print data. Next, in STEP S302, the CPU acquires a height conversion table for converting the kinds of special colors into heights. The height conversion table is stored as a correspondence relationship between height and the kinds of special colors in a storage device such as the non-volatile memory 30D, in advance.

Next, in STEP S304, the CPU converts the kinds of special colors at the positions of the individual pixels into heights at the corresponding pixel positions, using the height conversion table. Subsequently, in STEP S306, the CPU generates three-dimensional shape data representing a three-dimensional object to be formed on a recording medium, from the heights of the three-dimensional object at the positions of the individual pixels. Next, in STEP S308, the CPU generates slice data from the three-dimensional shape data.

Figure 21A:
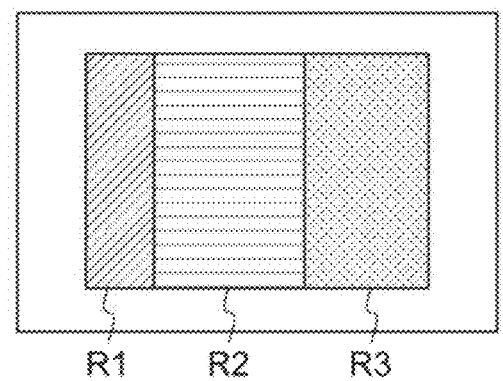
FIG. 21A is a view illustrating a further example of the special-color plate.
Figure 21B:
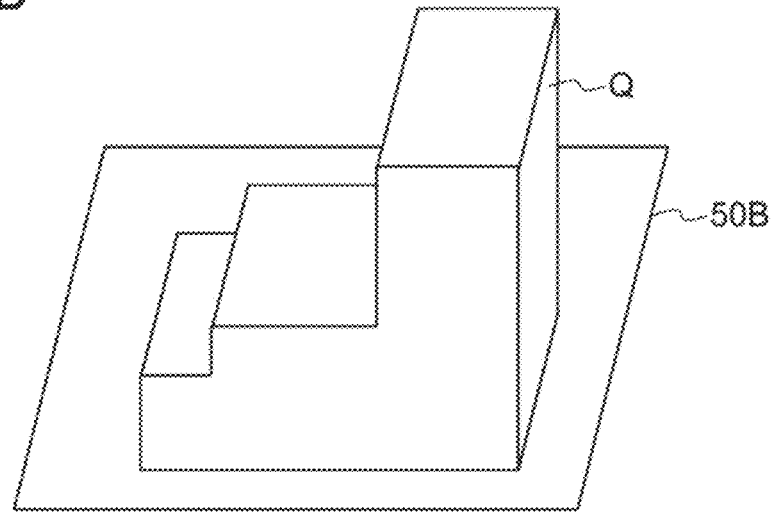
FIG. 21B is a view illustrating an example of a three-dimensional object which is formed from the special-color plate shown in FIG. 21A.

FIG. 21A is a view illustrating a further example of the special-color plate. In the third exemplary embodiment, from the special-color plate shown in FIG. 21A, a three-dimensional object Q shown in FIG. 21B is formed. As shown in FIG. 21A, each of the positions of pixels of the area $R_1$ of the special-color plate is associated with a special color $X_1$, and each of the positions of pixels of the area $R_2$ of the special-color plate is associated with the special color $X_2$, and each of the positions of pixels of the area R of the special-color plate is associated with a special color $X_3$.

Also, as shown in Table 1 described above, the special color $X_1$, the special color $X_2$, and the special color $X_3$ are associated with a height A, a height B, and a height C, respectively. The magnitude relationship of the height A, the height B, and the height C is A<B<C. In this case, as shown in FIG. 21B, the three-dimensional object Q having three heights is formed.

Fourth Exemplary Embodiment

With respect to the three-dimensional object forming system according to the first exemplary embodiment, the example in which the special-color plate is included as a two-dimensional image using one color in the print data has been described (see FIG. 10). In a three-dimensional object forming system according to a fourth exemplary embodiment, a special-color plate is included as a height designation page in print data.

In the three-dimensional object forming system according to the fourth exemplary embodiment, a special-color plate is included as a height designation page in print data, and a correspondence relationship between height and special-color density is given as a height conversion table. The other configuration is the same as that of the three-dimensional object forming system according to the first exemplary embodiment. Therefore, components identical to those of the first exemplary embodiment are denoted by the same reference symbols, and a description thereof will not be made. Hereinafter, the difference from the first exemplary embodiment will be described.

(Print Data for Three-Dimensional Object Formation)

In the fourth exemplary embodiment, print data for three-dimensional object formation includes height information on a three-dimensional object under the following conditions (1) to (4). Conditions (2) and (3) are the same as those of the first exemplary embodiment. Conditions (1) and (4) are different from those of the first exemplary embodiment. (1) A special-color plate is included as a height designation page in the print data. (2) An attribute for object formation is "SPECIAL-COLOR DENSITY". (3) The height of the three-dimensional object is a physical amount representing the distance from the bottom of the three-dimensional object to the top. (4) A correspondence relationship between height and special-color density is given as a height conversion table.

As the height conversion table which is used in the fourth exemplary embodiment, a height conversion table shown in FIG. 18 or 19 may be used. Also, FIG. 11 is a view illustrating an example of the correspondence relationship between height and special-color density; however, the correspondence relationship shown in FIG. 11 may be used as a height conversion table of the fourth exemplary embodiment.

The height designation page is print data of one page including the special-color plate. The height designation page is based on height information included in the print data and is inserted immediately before pages to form a three-dimensional object on a recording medium. Also, according to print data of pages to form the three-dimensional object on a recording medium, a two-dimensional image is formed on a recording medium to be a mount.

Also, as described above, the special-color plate is data on special-color densities representing the heights of the three-dimensional object at the positions of the individual pixels of the two-dimensional image. Image formation using the special color is not performed.

Figure 22A:
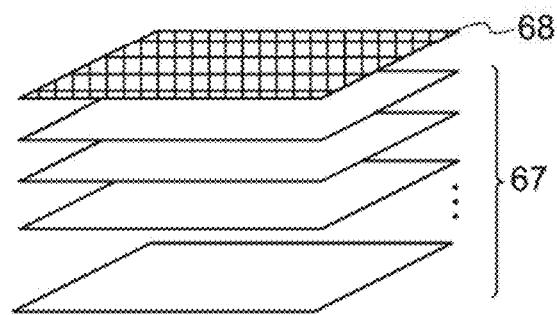
FIGS. 22A and 22B are schematic diagrams illustrating modes in which height designation pages are inserted.
Figure 22B:
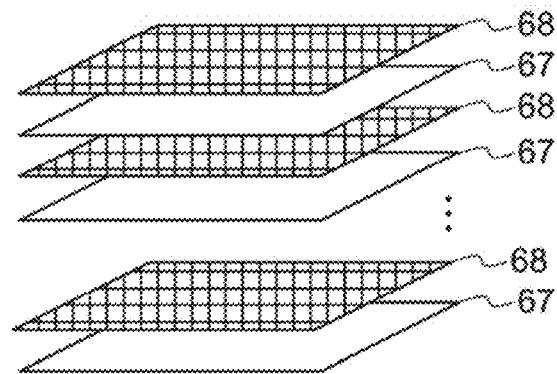

FIGS. 22A and 22B are schematic diagrams illustrating examples of modes in which height designation pages are inserted. In the case where print data of two or more pages is received, if height information is common to every page, as shown in FIG. 22A, a height designation page 68 is inserted at the head of received print data 67. By the height designation page 68 arranged as the first page, the heights of the print data 67 of the second page and the subsequent pages are expressed.

Also, in the case where height information designated for each page is included in print data, as shown in FIG. 22B, height designation pages 68 and print data items 67 are alternately arranged. In other words, by a height designation page 68 arranged as the first page, heights of a print data item 67 of the second page are expressed, and by a height designation page 68 arranged as the third page, heights of a print data item 67 of the fourth page are expressed.

(Slice Data Generating Process)

Due to the above-described difference, the procedure of the slice data generating process which is performed in STEP S20 of FIG. 13 is also changed. Hereinafter, a slice data generating process according to the fourth exemplary embodiment will be described.

Figure 23:
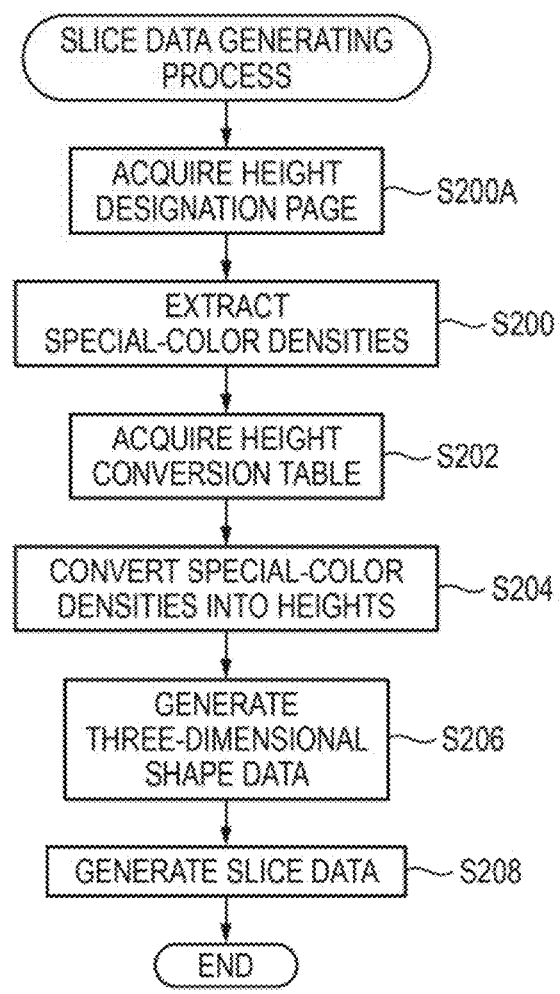
FIG. 23 is a flow chart illustrating an example of the proceeding procedure of a slice data generating process according to a fourth exemplary embodiment.

FIG. 23 is a flow chart illustrating an example of the proceeding procedure of the slice data generating process according to the fourth exemplary embodiment. The proceeding procedure shown in FIG. 23 is the same as the proceeding procedure of the slice data generating process of the second exemplary embodiment (see FIG. 17) except that it further includes STEP S200A before STEP S200.

First, in STEP S200A, the CPU acquires a height designation page from print data.

Next, in STEP S200, the CPU extracts special-color densities at the positions of pixels of a two-dimensional image, from the height designation page. Subsequently, in STEP S202, the CPU acquires a height conversion table for converting the special-color densities into heights. The height conversion table is stored as a correspondence relationship between height and special-color density in a storage device such as the non-volatile memory 30D, in advance.

Next, in STEP S204, the CPU converts the special-color densities at the positions of the pixels into heights at the corresponding pixel positions, using the height conversion table. Subsequently, in STEP S206, the CPU generates three-dimensional shape data representing a three-dimensional object to be formed on a recording medium, from the heights of the three-dimensional object at the positions of the pixels. Next, in STEP S208, the CPU generates slice data from the three-dimensional shape data.

Fifth Exemplary Embodiment

With respect to the three-dimensional object forming system according to the first exemplary embodiment, the example in which the height of the three-dimensional object is a physical amount representing the distance from the bottom of the three-dimensional object to the top has been described. In a three-dimensional object forming system according to a fifth exemplary embodiment, the height of a three-dimensional object is expressed as the number of recording media to be stacked.

In the three-dimensional object forming system according to the fifth exemplary embodiment, the height of a three-dimensional object is expressed as the number of recording media to be stacked, and a correspondence relationship between the number of recording media to be stacked and special-color density is given as a table for conversion into the numbers of recording media to be stacked. In these points, a method of performing association with height information which is a premise is different from that of the three-dimensional object forming system according to the first exemplary embodiment.

Also, according to the above-mentioned difference in premise, the procedure of processing which is performed by the information processing apparatus 10 is different from that of the three-dimensional object forming system according to the first exemplary embodiment, in that image data of stacking elements is generated from the numbers of recording media to be stacked at the positions of individual pixels without generating three-dimensional shape data and slice data.

<Three-Dimensional Object Formation Using Print Data>
(Print Data for Three-Dimensional Object Formation)

First, print data for three-dimensional object formation will be described.

In the fifth exemplary embodiment, print data for three-dimensional object formation includes height information on a three-dimensional object under the following conditions (1) to (4). Conditions (1) and (2) are the same as those of the first exemplary embodiment. Conditions (3) and (4) are different from those of the first exemplary embodiment. (1) A special-color plate is included as a two-dimensional image using one color in the print data. (2) An attribute for object formation is "SPECIAL-COLOR DENSITY". (3) The height of the three-dimensional object is expressed as the number of recording media to be stacked. (4) A correspondence relationship between the number of recording media to be stacked and special-color density is given as a table for conversion into the numbers of recording media to be stacked.

Figure 24A:
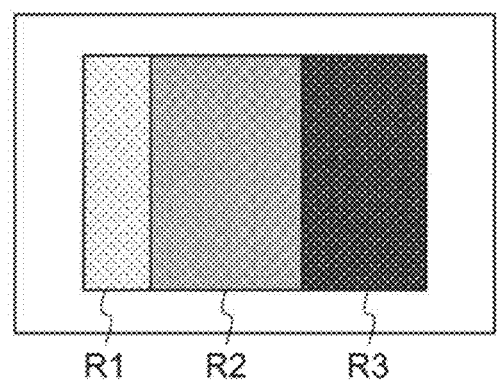
FIG. 24A is a view illustrating a still further example of the special-color plate.
Figure 24B:
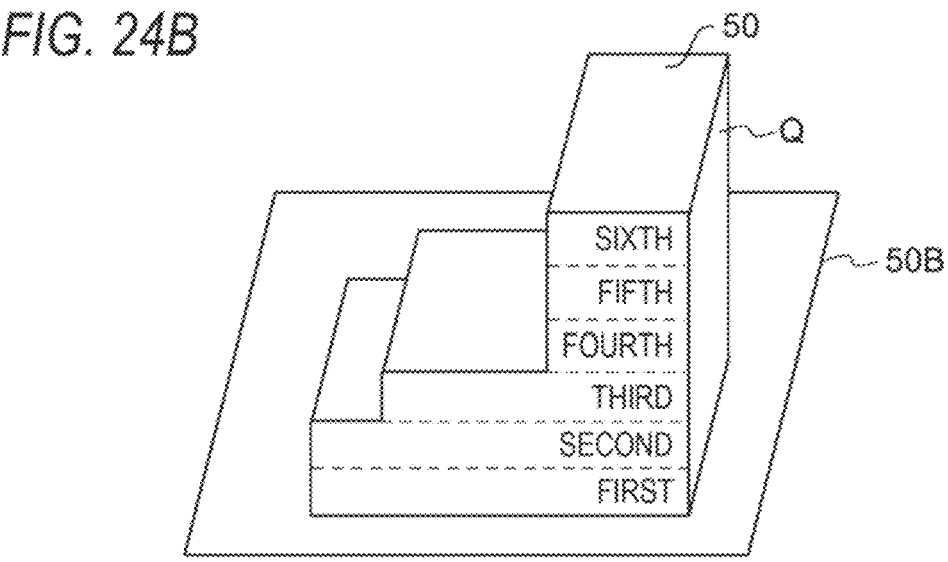
FIG. 24B is a view illustrating an example of a three-dimensional object which is formed from the special-color plate shown in FIG. 24A.

With reference to FIGS. 24A and 24B, a method of associating height information with an attribute for object formation will be described in detail. Here, the case where the attribute for object formation is "SPECIAL-COLOR DENSITY" will be described. Also, the height of a three-dimensional object is expressed as the number of recording media to be stacked to form the three-dimensional object. Hereinafter, the height of a three-dimensional object will be referred to as the number of recording media to be stacked to form the three-dimensional object.

FIG. 24A is a view illustrating an example of the special-color plate. From the special-color plate shown in FIG. 24A, a three-dimensional object Q shown in FIG. 24B is formed on a recording medium 50B having a two-dimensional image G (not shown in the drawings) formed thereon.

The position of each pixel of the two-dimensional image G is associated with a special-color density according to the number of recording media to be stacked to form the three-dimensional object. A correspondence relationship between the number of recording media to be stacked and special-color density is determined in advance. With reference to the correspondence relationship between the number of recording media to be stacked and special-color density, special-color densities at the positions of individual pixels of the two-dimensional image (are set to densities according to the numbers of recording media to be stacked at the corresponding pixel positions to form the three-dimensional object. Also, with respect to the position of each pixel which is not associated with any special-color density, since the three-dimensional object is not formed, the special-color density is set to zero, and the number of recording media to be stacked to form the three-dimensional object also is set to zero.

Figure 25:
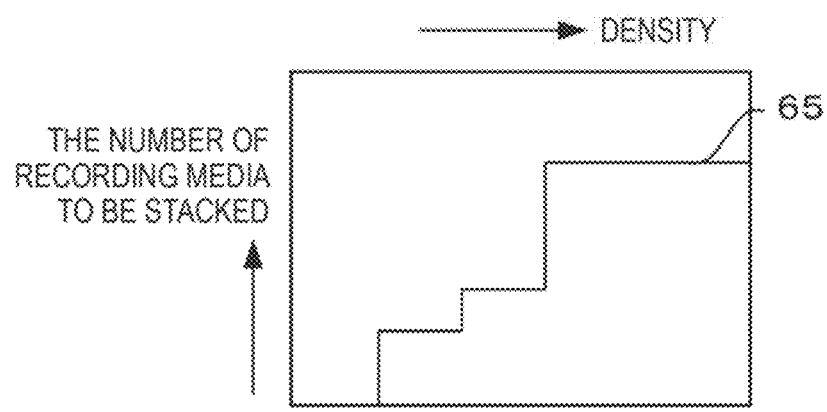
FIG. 25 is a graph illustrating an example of a table representing a correspondence relationship between the number of recording media to be stacked and special-color density.

FIG. 25 is a graph illustrating an example of a table representing a correspondence relationship between the number of recording media to be stacked and special-color density. A table for conversion into the numbers of recording media to be stacked is a table representing a correspondence relationship between the number of recording media to be stacked to form a three-dimensional object and special-color density. A table for conversion into the numbers of recording media to be stacked can be expressed, for example, as a graph 65 with density on a horizontal axis and the number of recording media to be stacked on a vertical axis, as shown in FIG. 25. In the example shown in FIG. 25, the number of recording media to be stacked varies in a stepwise manner with respect to special-color density. Also, a correspondence relationship between the number of recording media to be stacked and special-color density is acquired in advance by the information processing apparatus 10 before three-dimensional object formation using print data is performed.

As shown in FIG. 24A, each of the positions of pixels of an area $R_1$ of the special-color plate is associated with a special-color density $D_1$, and each of the positions of pixels of an area $R_2$ of the special-color plate is associated with a special-color density $D_2$, and each of the positions of pixels of an area $R_3$ of the special-color plate is associated with a special-color density $D_3$. The magnitude relationship of the special-color densities $D_1$, $D_2$, and D is $D_1<D_2<D_3$.

For example, it is assumed that, according to the table for conversion into the numbers of recording media to be stacked, shown in FIG. 25, the special-color density $D_1$, the special-color density $D_2$, and the special-color density $D_3$ are associated with 2, 3, and 6 which are the numbers of recording media to be stacked, respectively. In this case, as shown in FIG. 24B, a three-dimensional object Q having three different heights (corresponding to three different numbers of recording media to be stacked, i.e. 2, 3, and 6).

(Function of Information Processing Apparatus)

Now, the functional configuration of the information processing apparatus will be described.

Figure 26:
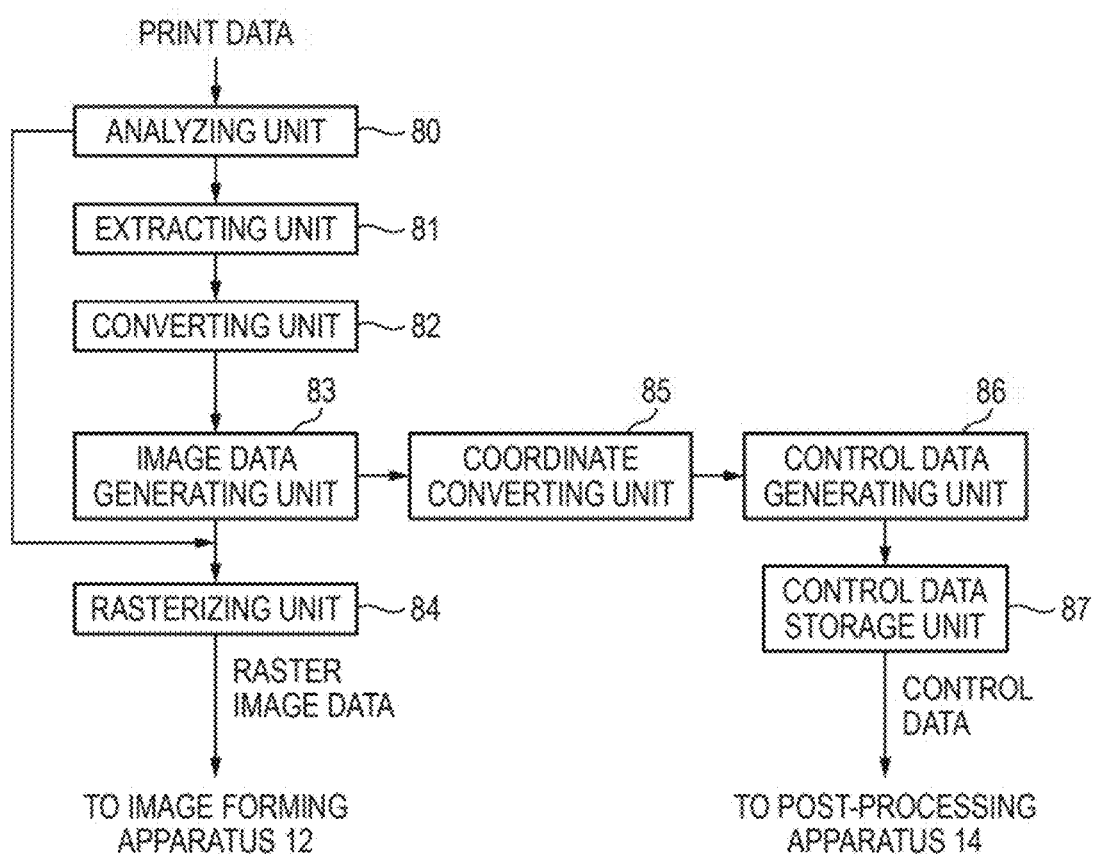
FIG. 26 is a functional block diagram illustrating an example of the functional configuration of an information processing apparatus of a fifth exemplary embodiment related to three-dimensional object formation using print data.

FIG. 26 is a functional block diagram illustrating an example of the functional configuration of the information processing apparatus of the fifth exemplary embodiment related to three-dimensional object formation using print data. The information processing apparatus 10 includes a three-dimensional data processing unit (not shown in the drawings) configured to receive three-dimensional data and process the received three-dimensional data, thereby generating slice data and control data, besides functional components shown in FIG. 26; however, a description of the three-dimensional data processing unit will not be made here.

As shown in FIG. 26, the information processing apparatus 10 includes an analyzing unit 80, an extracting unit 81, a converting unit 82, an image data generating unit 83, a rasterizing unit 84, a coordinate converting unit 85, a control data generating unit 86, and a control data storage 87. The analyzing unit 80 is an example of the receiving unit. Also, each of the image data generating unit 83 and the rasterizing unit 84 is an example of the output unit.

If the analyzing unit 80 receives print data, it analyzes whether the print data includes height information, on the basis of whether the print data includes designation information. In the case where height information is included, the analyzing unit 80 notifies the received print data to the extracting unit 81 in order to form a three-dimensional object on the basis of the print data.

If the extracting unit 81 receives print data including height information, it extracts an attribute for object formation associated with the height information, from the received print data.

In the present exemplary embodiment, the attribute for object formation is "SPECIAL-COLOR DENSITY", and the height information is included as special-color densities in the print data. Therefore, the extracting unit extracts special-color densities at the positions of individual pixels of a two-dimensional image.

The converting unit 82 converts the special-color densities at the positions of the individual pixels into the numbers of recording media to be stacked at the corresponding pixel positions in order to form a three-dimensional object, with reference to a correspondence relationship between the number of recording media to be stacked and special-color density (see FIG. 25).

The image data generating unit 83 extracts pixels constituting a stacking element for each of recording media to be stacked, from the numbers of recording media to be stacked at the positions of the pixels in order to form the three-dimensional object, and generates image data on each of the stacking elements for the recording media to be stacked.

Also, to image data of each stacking element, identification information representing the position of the corresponding stacking element in the stacking order (the N-th position) is added. In the case of stacking recording media on a recording medium which is a mount, the position of the corresponding stacking element in the stacking order (the N-th position) is set without counting the recording medium which is a mount.

It is assumed that a value representing the number of recording media to be stacked associated with the position of each pixel is $N_{MAX}$. Referring to the slice image shown in FIG. 6A, on a recording medium to be stacked for the N-th time, a set of pixels at which N is not larger than $N_{MAX}$ constitute the stacking element 52, and a set of pixels at which N is larger than $N_{MAX}$ constitute the unnecessary portion 53. For example, binary raster image data in which, of the pixels, the pixels at which N is not larger than $N_{MAX}$ are expressed as 1 and the pixels at which N is larger than $N_{MAX}$ are expressed as 0 becomes image data of the stacking element. The stacking element 52 is cut out from the recording medium 50 and is stacked.

Figure 29A:
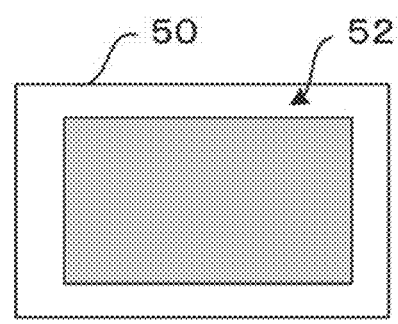
Figure 29B:
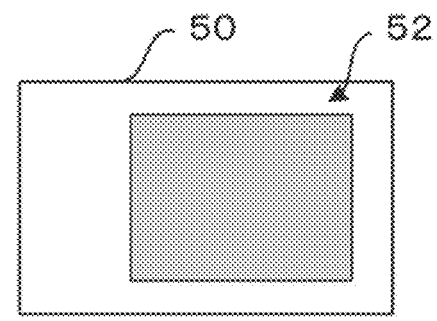
Figure 29C:
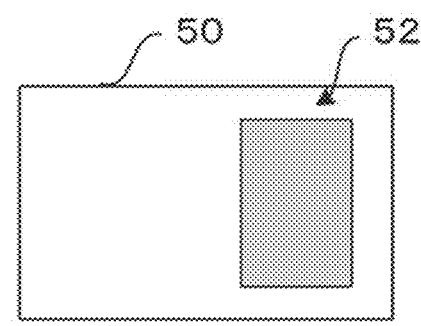

FIGS. 29A to 29C are examples of image data of recording media.

For example, in the case of forming the three-dimensional object Q shown in FIG. 24B from the special-color plate shown in FIG. 24A, the image data shown in FIGS. 29A to 29c is generated. Here, the position of each pixel of the area $R_1$ of the special-color plate, the position of each pixel of the area $R_2$, and the position of each pixel of the area $R_3$ are associated with 2 ($N_{MAX}=2$), 3 ($N_{MAX}=3$), and 6 ($N_{MAX}=6$) which are the numbers of recording media to be stacked, respectively.

On each of recording media which should be stacked for the first time (N=1) or for the second time (N=2), at the position of each pixel of the area $R_1$, the area $R_2$, and the area $R_3$, N is not larger than $N_{MAX}$. Therefore, as shown in FIG. 29A, image data of a stacking element 52 including the pixels of the area $R_1$, the area $R_2$, and the area $R_3$ is generated.

On a recording medium which should be stacked for the third time (N=3), at the position of each pixel of the area $R_2$ and the area $R_3$, N is not larger than $N_{MAX}$. Meanwhile, at the position of each pixel of the area $R_1$, N is larger than $N_{MAX}$. Therefore, as shown in FIG. 29B, image data of a stacking element including the pixels of the area $R_2$ and the area $R_3$ is generated.

On each of recording media which should be stacked for the fourth time (N=4), for the fifth time (N=5), or for the sixth time (N=6), at the position of each pixel of the area $R_3$, N is not larger than $N_{MAX}$. Meanwhile, at the position of each pixel of the area $R_1$ and the area $R_2$, N is larger than $N_{MAX}$. Therefore, as shown in FIG. 29C, image data of a stacking element 52 including the pixels of the area $R_3$ is generated.

Also, for each pixel of the image data of the stacking elements, color information may be set. Also, processing on the image data of the stacking elements will be described below.

The image data generated by the image data generating unit 83 is output, together with the original image data included in the print data, to the rasterizing unit 84. Also, the image data generated by the image data generating unit 83 is output to the coordinate converting unit 85.

The rasterizing unit 84 rasterizes the image data, thereby generating raster image data. For example, in the case where the image data generating unit 83 has generated image data including information on densities of the fundamental colors, the rasterizing unit generates raster image data of each of the colors C, M, Y. and K. Raster image data on the two-dimensional image and raster image data on the slice images are output to the image forming apparatus 12.

The coordinate converting unit 85 converts the image data on the stacking element 52 generated for each recording medium to be stacked, into coordinate data on the stacking element 52. The coordinate data of the stacking element 52 is output to the control data generating unit 86.

In the present exemplary embodiment, a ground plane on which a three-dimensional object Q is placed is referred to as an X-Y plane. Also, a direction in which recording media are stacked in order to form the three-dimensional object Q (a stacking direction) is referred to as a Z-axis direction. Therefore, from the position of each pixel, an x coordinate and a y coordinate are obtained, and from the position of the corresponding recording medium in the stacking order, a z coordinate is obtained. For example, when the thickness of each recording medium is "d", on a recording medium which should be stacked for the N-th time, the value of each z coordinate is (N×d).

The control data generating unit 86 generates control data from the coordinate data of the stacking elements 52 obtained in the coordinate converting unit 85. Also, the control data generating unit generates control data for applying glue to the recording medium which is a mount. The generated control data is stored in the control data storage 87 in association with identification information (for example, numbers representing the positions in the stacking order). Further, if a post-processing start instruction is received from the user, the control data is read out from the control data storage 87 and is output to the post-processing apparatus 14.

Meanwhile, in the case where the print data received by the analyzing unit 80 does not include height information, the analyzing unit 80 outputs the received print data to the rasterizing unit 84, which generates raster image data corresponding to the print data. In other words, the information processing apparatus 10 performs a normal image forming process of forming images on recording media.

The functions of the analyzing unit 80, the extracting unit 81, the converting unit 82, the image data generating unit 83, the rasterizing unit 84, the coordinate converting unit 85, and the control data generating unit 86 described above are executed by the CPU 30A.

Also, similarly to the first exemplary embodiment, the storage for storing control data may be arranged outside the information processing apparatus 10. Also, similarly to the first exemplary embodiment, as the storage for storing control data, a portable computer-readable recording medium such as a USB (Universal Serial Bus) memory may be used.

(Information Processing Program)

Now, an information processing program will be described.

Figure 27:
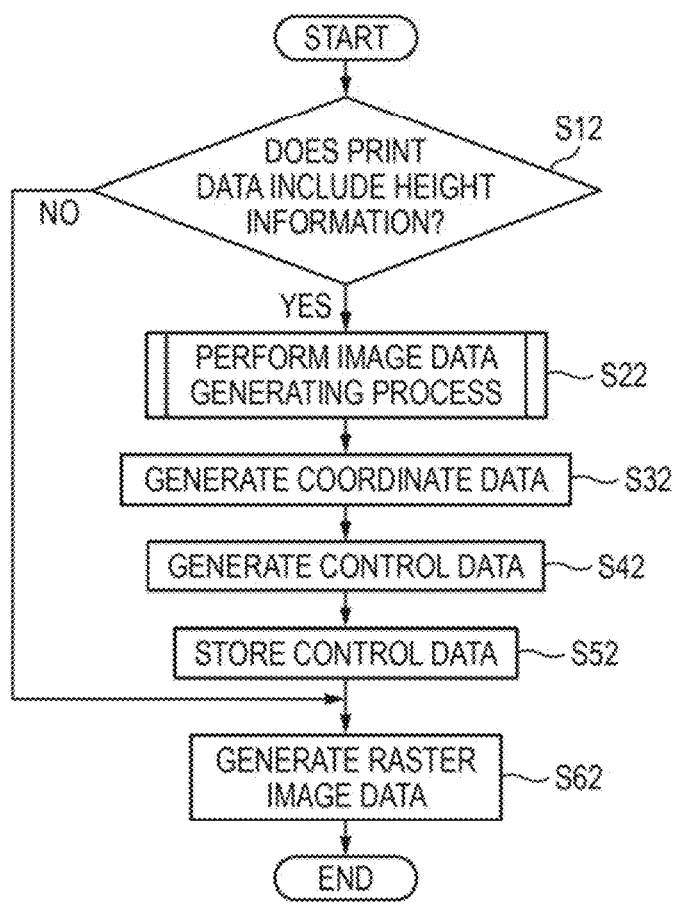
FIG. 27 is a flow chart illustrating an example of the proceeding procedure of an information processing program according to the fifth exemplary embodiment.

FIG. 27 is a flow chart illustrating an example of the proceeding procedure of an information processing program according to the fifth exemplary embodiment. The information processing program is stored in the ROM 30B of the information processing apparatus 10. If an image formation instruction is received from the user, the CPU 30A of the information processing apparatus 10 reads out the information processing program from the ROM 30B and executes the information processing program.

In STEP S12, the CPU determines whether print data includes designation information specifying association of height information with a designated attribute. In the case where the print data includes designation information, the CPU proceeds to STEP S22. Meanwhile, in the case where the print data does not include designation information, the CPU proceeds to STEP S62. Next, in STEP S22, the CPU performs an image data generating process of generating image data on stacking elements to be used for three-dimensional object formation, from the height information included in the print data.

Next, in STEP S32, the CPU generates coordinate data on the stacking elements, from the image data on the stacking elements. Subsequently, in STEP S42, the CPU generates control data from the coordinate data on the stacking elements. Next, in STEP S52, the CPU stores the control data generated in STEP S42, in the control data storage 87. Subsequently, in STEP S62, the CPU generates raster image data from the image data, and transmits the generated raster image data to the image forming apparatus 12, and finishes the information processing program shown in FIG. 27.

In the case where the CPU has proceeded from STEP S52 to STEP S62, in STEP S62, the CPU generates raster image data with respect to the image data on the two-dimensional image included in the print data and the image data on the stacking elements generated in STEP S52. Meanwhile, in the case where the CPU has proceeded from STEP Sit) to STEP S60, since it is required to perform a normal image forming process, the CPU generates raster image data with respect to the image data included in the print data.

(Image Data Generating Process)

Now, the image data generating process which is performed in STEP S22 will be described.

Figure 28:
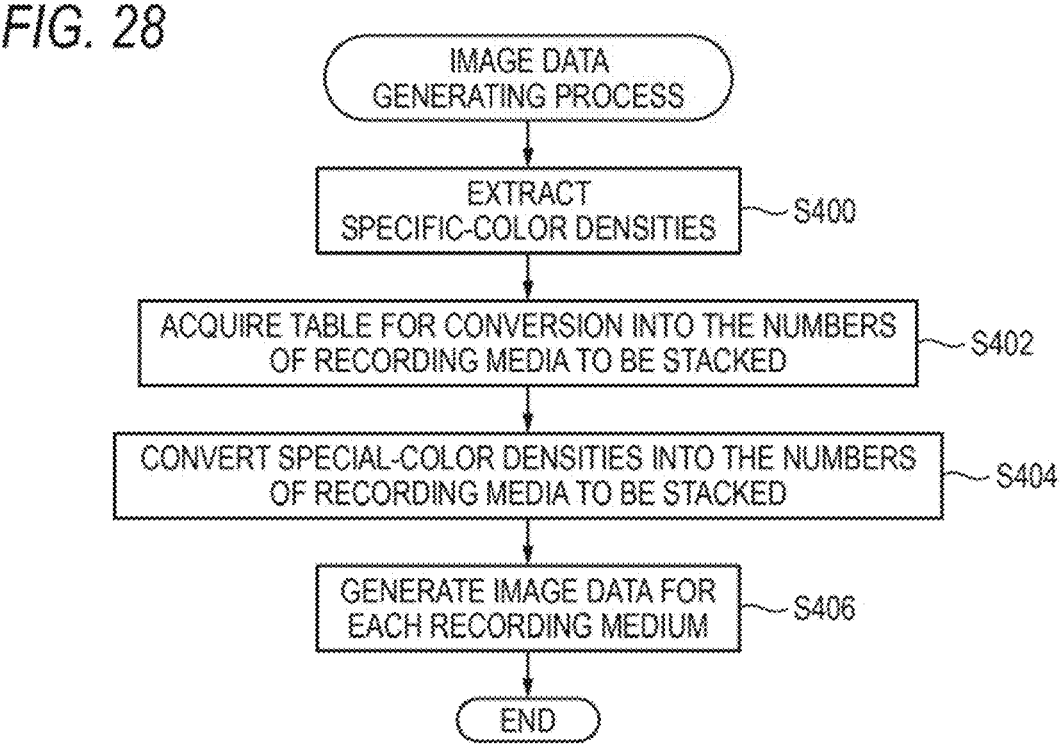
FIG. 28 is a flow chart illustrating an example of the proceeding procedure of an image data generating process.

FIG. 28 is a flow chart illustrating an example of the proceeding procedure of the image data generating process. First, in STEP S400, the CPU extracts special-color densities at the positions of pixels of the two-dimensional image, from the print data. Next, in STEP S402, the CPU acquires a table for conversion into the numbers of recording media to be stacked to be used to convert into the special-color densities into the numbers of recording media to be stacked. Also, the table for conversion into the numbers of recording media to be stacked is stored as a correspondence relationship between the number of recording media to be stacked and special-color density, in a storage device such as the non-volatile memory 30D, in advance.

Next, in STEP S404, the CPU converts the special-color densities at the positions of the pixels into the numbers of recording media to be stacked at the corresponding pixel positions, using the table for conversion into the numbers of recording media to be stacked. Subsequently, in STEP S406, the CPU generates image data of stacking elements in the above-mentioned order, from the numbers of recording media to be stacked at the positions of the pixels to form a three-dimensional object.

(Image Formation and Three-Dimensional Object Formation)

In the fifth exemplary embodiment, as shown in FIG. 24B, the image forming apparatus 12 forms a two-dimensional image G (not shown in the drawings) on a recording medium 50B which is a mount. Also, the image forming apparatus 12 forms images of stacking elements on other recording media. The post-processing apparatus 14 performs post-processing on the recording medium which is a mount and the recording media having the images of the stacking elements formed thereon, thereby forming a three-dimensional object Q on the recording medium 50B which is a mount. On the recording medium 50B having the two-dimensional image G formed thereon, the three-dimensional object Q which is an object for which the special color has been designated is formed.

Stacking elements (images) according to the fifth exemplary embodiment are different from slice images which are obtained by slicing three-dimensional shape data representing a three-dimensional model; however, they are the same as slice images in that they represent stacking elements to be cut out from recording media. Therefore, by replacing slice images with stacking elements, a process of forming a three-dimensional object Q can be explained.

(Fourth Modification)

In a fourth modification, processing on the image data of the stacking elements will be described.

Figure 30A:
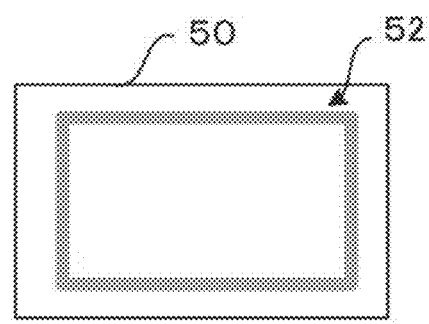
FIGS. 30A, 30B and 30C are views illustrating other examples of image data items for individual recording media, respectively.
Figure 30B:
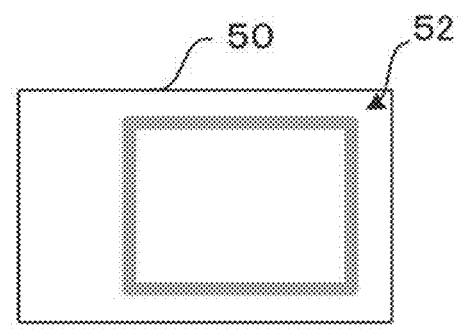
Figure 30C:
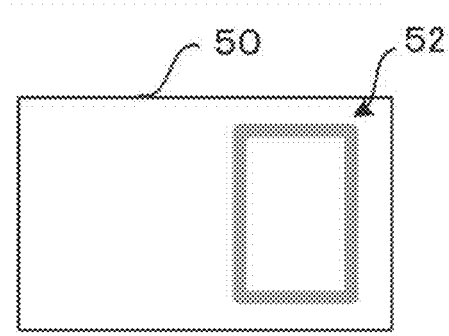

Before forming images of the stacking elements, the CPU may process the image data of the stacking elements. For example, in order to impart a color to the three-dimensional object, as shown in FIGS. 30A to 30C, the CPU sets color information for each of pixels on the contour line of each stacking element 52. For each pixel, a special-color density may be set, or the densities of the fundamental colors may be set.

Figure 31A:
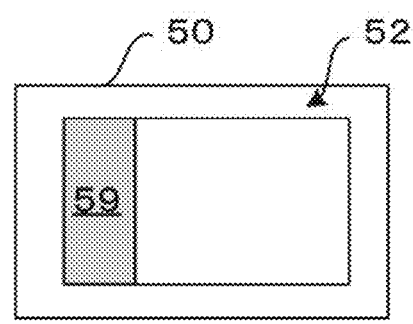
FIGS. 31A, 31B and 31C are views illustrating still further examples of image data items for individual recording media, respectively.
Figure 31B:
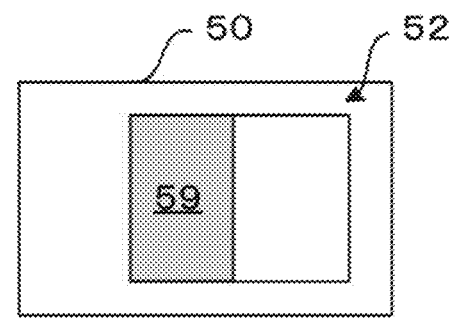
Figure 31C:
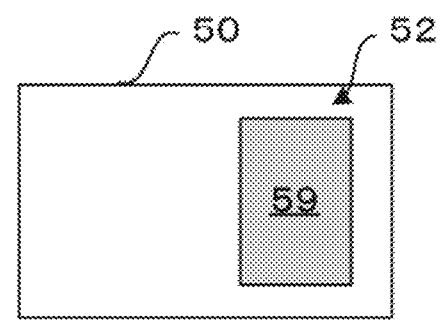

Also, for example, in order to form characters or an image on the three-dimensional object, as shown in FIGS. 31A to 31C, the CPU superimposes image data representing characters or images 59 on the image data of the stacking elements 52. As shown in FIG. 24B, on exposure parts to be exposed without any other element thereon when formation of the three-dimensional object Q is completed, such as some parts of the recording media to be stacked for the second time, for the third time, or for the sixth time, the characters or images 59 are formed such that the characters or images 59 can be seen from the outside.

(Fifth Modification)

In a fifth modification, another method of generating control data will be described.

As described above, the format of control data is not limited to coordinate data. For example, binary raster image data representing cutting lines 54 and glue application areas 58 may be used. Therefore, in the case where image data of stacking elements is binary raster image data, the image data of the stacking elements may be used as control data, without any changes.

<Other Modifications>

Also, it goes out without saying that the configurations of the information processing apparatuses, the programs, and the three-dimensional object forming systems described in the first to fifth exemplary embodiments are merely examples and those configurations can be modified without departing from the gist of the present invention.

(Compatibility of Height Information)

In the first to fourth exemplary embodiments described above, the height of a three-dimensional object is a physical amount representing the distance from the bottom of the three-dimensional object to the top. In the fifth exemplary embodiment described above, the height of a three-dimensional object is expressed as the number of recording media to be stacked.

Similarly to the case of obtaining each z coordinate from the position of a corresponding recording medium in the stacking order, when it is assumed that the thickness of each recording medium is "d", the number of recording media to be stacked, i.e. $N_{MAX}$ is converted into a height of ($N_{MAX} \times d$). Also, when it is assumed that the thickness of each recording medium is "d", a height H is converted into the number of recording media to be stacked, i.e. the value of H/d. Also, in the case where H cannot be divided by d, the integer part of the value of H/d is obtained as the number of recording media to be stacked; however, an integer obtained by rounding the value of H/d up or an integer obtained by rounding the value of H/d down may be obtained as the number of recording media to be stacked.

As described above, heights which are physical amounts representing distances and the numbers of recording media to be stacked are compatible with each other. Each of the heights of the three-dimensional objects of the first to fourth exemplary embodiments described above may be expressed as the number of recording media to be stacked, and each of the heights of the three-dimensional object of the fifth exemplary embodiment described above may be expressed as a physical amount representing the distance from the bottom of the three-dimensional object to the top.

(Generation of Print Data Including Height Information)

In the first to fifth exemplary embodiments described above, the case where the information processing apparatus 10 acquires print data including height information from the outside has been described; however, the information processing apparatus 10 may generate print data including height information.

(Designation of Color Other than Special Color)

In the first to fifth exemplary embodiments described above, the example in which the special color is designated has been described; however, a color other than the special color may be designated. Of applications for generating print data, some applications are not assumed to use special colors. Therefore, print data generated by an application which is not assumed to use a special may not include an attribute representing special-color densities. In this case, instead of special-color densities, an attribute designating densities of the fundamental colors is used to set each height of a three-dimensional object Q.

Specifically, a designated color which is expressed by a combination of densities of the fundamental colors is associated with height in advance, and for individual pixels, densities of the fundamental colors of the designated color corresponding to designated heights are set.

For example, the densities of the fundamental colors are expressed by pixel values, and a height of 10 mm is associated with a combination of a cyan density of 0, a magenta density of 0, a yellow density of 0, and a black density of 100. In this case, print data including an object for which black (K) has been designated is generated, and black densities become an attribute for object formation. Black (K) is expressed as a combination of densities of C. M. and Y (so-called process black), and black densities are set as an attribute for object formation.

However, combinations of densities of the fundamental colors are not limited to the above-mentioned example. For example, the height of 10 mm may be associated with a cyan density of 0, or the height of 10 mm may be associated with a combination of a cyan density of 0 and a magenta density of 0.

What is claimed is:

1. An information processing apparatus comprising a processor configured to:
   receive a data of printing; and
   output image data of each of a plurality of elements which are parts of recording media, in response to receiving print data including information of special-color density according to a height of a three-dimensional object at positions of each pixel of image data on a two-dimensional image generated such that the three-dimensional object is formed by stacking the plurality of elements, and the image data is generated from the height information of the three-dimensional object corresponding to special-color density at the positions of the each pixel;
   wherein the three-dimensional object is formed on a recording medium which is a mount,
   the image data on the two-dimensional image is image data on a two-dimensional image for a mount which is formed on the recording medium which is the mount, and
   the processor is configured to output the image data of each of the plurality of elements, and the image data on the two-dimensional image for the mount.

2. The information processing apparatus according to claim 1, wherein:
   the height information is physical amounts representing the distances from the bottom of the three-dimensional object to the top.

3. The information processing apparatus according to claim 2, wherein:
   the image data of each of the plurality of elements is generated by slicing a three-dimensional shape obtained from the height information of the three-dimensional object at the positions of the each pixel, in a direction intersecting with a stacking direction.

4. The information processing apparatus according to claim 3, wherein:
   the three-dimensional shape is obtained by setting a ground plane on which the three-dimensional object is placed as an X-Y plane, and setting the stacking direction as a Z-axis direction, and converting the height information of the three-dimensional object at the positions of the each pixel into coordinate data in a three-dimensional space.

5. The information processing apparatus according to claim 3, wherein:
   the three-dimensional shape is sliced at intervals according to the thickness of each of the recording media.

6. The information processing apparatus according to claim 1, wherein:
the height information is the numbers of recording media to be stacked at the positions of the individual each pixel of the two-dimensional image.

7. The information processing apparatus according to claim 6, wherein:
the image data of each of the plurality of elements is generated by extracting each pixel at which the numbers of recording media to be stacked associated with the positions of the corresponding each pixel are equal to or larger than the position of a corresponding recording media in the stacking order.

8. A non-transitory computer readable medium storing a program causing a computer to function as the units of the information processing apparatus according to claim 1.

9. A three-dimensional object forming system comprising:
the information processing apparatus according to claim 1;
an image forming apparatus that forms images on recording media according to image data; and
a post-processing apparatus for three-dimensional object formation that performs post-processing for three-dimensional object formation on recording media having images formed thereon.

10. The three-dimensional object forming system according to claim 9, wherein:
on the basis of the image data of each of the plurality of elements, the image forming apparatus forms images of the plurality of elements on different recording media, respectively, and
the post-processing apparatus for three-dimensional object formation cuts out the plurality of elements from the recording media having the images formed thereon, and stacking the plurality of elements, thereby forming the three-dimensional object.

11. The three-dimensional object forming system according to claim 9, wherein:
on the basis of image data on a two-dimensional image for a mount, the image forming apparatus forms the two-dimensional image for a mount on a recording medium which is a mount, and on the basis of the image data of each of the plurality of elements, the image forming apparatus forms images of the plurality of elements on different recording media, respectively, and
the post-processing apparatus for three-dimensional object formation cuts out the plurality of elements from the recording media having the images formed thereon, and stacking the plurality of cut elements on the recording medium which is the mount, thereby forming the three-dimensional object.

* * * * *